US012583955B2

(12) United States Patent
Kipiani et al.

(10) Patent No.: US 12,583,955 B2
(45) Date of Patent: Mar. 24, 2026

(54) METALLOCENE COMPLEXES AND CATALYSTS MADE THEREFROM

(71) Applicant: BOREALIS AG, Vienna (AT)

(72) Inventors: Georgy Kipiani, Kulloo (FI); Marja Mustonen, Kulloo (FI); Pascal Castro, Kulloo (FI); Kalle Kallio, Kulloo (FI); Irfan Saeed, Kulloo (FI); Jyrki Kauhanen, Kulloo (FI); Tiina Hämäläinen, Kulloo (FI); Esko Saikkonen, Kulloo (FI); Jarkko Hassinen, Kulloo (FI); Joana Elvira Kettner, Linz (AT); Matthias Hoff, Linz (AT); Alexander Z. Voskoboynikov, Moscow (RU); Vyatcheslav V. Izmer, Moscow (RU); Dmitry S. Kononovich, Moscow (RU)

(73) Assignee: BOREALIS AG, Vienna (AT)

( * ) Notice: Subject to any disclaimer, the term of this patent is extended or adjusted under 35 U.S.C. 154(b) by 404 days.

(21) Appl. No.: 18/017,460

(22) PCT Filed: Jul. 23, 2021

(86) PCT No.: PCT/EP2021/070763
§ 371 (c)(1),
(2) Date: Jan. 23, 2023

(87) PCT Pub. No.: WO2022/018293
PCT Pub. Date: Jan. 27, 2022

(65) Prior Publication Data

US 2025/0171481 A1 May 29, 2025

(30) Foreign Application Priority Data

Jul. 23, 2020 (EP) .................................... 20187383

(51) Int. Cl.
*C08F 210/16* (2006.01)
*B01J 31/12* (2006.01)
(Continued)

(52) U.S. Cl.
CPC ........... *C08F 210/16* (2013.01); *B01J 31/122* (2013.01); *B01J 37/0201* (2013.01); *C07F 17/00* (2013.01);
(Continued)

(58) Field of Classification Search
CPC ............... C08F 210/16; C08F 4/65912; C08F 2420/07; C08F 4/65916; B01J 31/122;
(Continued)

(56) References Cited

U.S. PATENT DOCUMENTS 6,169,051 B1 1/2001 Mitani et al.
6,184,402 B1 2/2001 Yamazaki et al.
(Continued)

FOREIGN PATENT DOCUMENTS

CN 103380151 A 10/2013
CN 103582669 A 2/2014
(Continued)

OTHER PUBLICATIONS

Severn et al. "Bound but not gagged"—Immobilizing Single-Site alpha-olefin polmerization catalysts, Che. Rev. (2005), 105, 4073-41447.

(Continued)

*Primary Examiner* — Christina A Johnson
(74) *Attorney, Agent, or Firm* — Meunier Carlin & Curfman LLC

(57) ABSTRACT

A racemic metallocene complex of formula (I') wherein each X is a sigma donor ligand; L is a carbon, silicon or germanium based divalent bridge in which one or two
(Continued)

backbone atoms link the ligands; M is Ti, Zr or Hf; each Het is independently a monocyclic or multicyclic heteroaromatic or heterocyclic group containing at least one heteroatom selected from O, N or S; each $R_1$ is the same or different and is a linear $C_{1-10}$ alkyl group, or linear $C_{1-10}$ alkoxy, each n is 0 to 3; each $R_2$ is the same or different and is a —Si (RaRbRc) group; Ra is $C_{1-10}$ alkyl or phenyl group optionally substituted by 1 to 3 $C_{1-6}$ alkyl groups; Rb is $C_{1-10}$ alkyl or phenyl group optionally substituted by 1 to 3 $C_{1-6}$ alkyl groups; Rc is a phenyl group optionally substituted by 1 to 3 $C_{1-6}$ alkyl groups; and each p is 1 to 3.

(I')

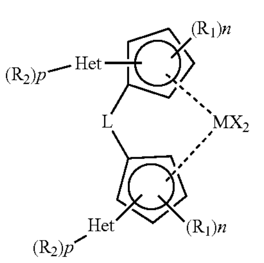

19 Claims, 5 Drawing Sheets

(51) Int. Cl.
*B01J 37/02* (2006.01)
*C07F 17/00* (2006.01)
*C08F 4/659* (2006.01)

(52) U.S. Cl.
CPC ....... *C08F 4/65912* (2013.01); *B01J 2231/12* (2013.01); *B01J 2531/48* (2013.01); *C08F 2420/07* (2021.01)

(58) Field of Classification Search
CPC ............... B01J 37/0201; B01J 2231/12; B01J 2531/48; C07F 17/00
See application file for complete search history.

(56) References Cited

U.S. PATENT DOCUMENTS

| | | | |
|---|---|---|---|
| 6,326,493 B1 | 12/2001 | Mitani et al. | |
| 9,079,985 B2 | 7/2015 | Resconi et al. | |
| 9,309,340 B2 | 4/2016 | Ishihama et al. | |
| 9,567,351 B2 | 2/2017 | Hafner et al. | |
| 9,598,517 B2 | 3/2017 | Resconi et al. | |
| 9,963,522 B2 | 5/2018 | Suzuki et al. | |
| 2005/0192418 A1 | 9/2005 | Ewen et al. | |
| 2018/0237565 A1 | 8/2018 | Ishihama et al. | |
| 2019/0283009 A1 | 9/2019 | Holtcamp et al. | |
| 2021/0095057 A1* | 4/2021 | Resconi | C08F 4/65927 |
| 2024/0002560 A1* | 1/2024 | Kipiani | B01J 37/0201 |
| 2024/0287217 A1* | 8/2024 | Castro | C08F 10/02 |
| 2024/0287224 A1* | 8/2024 | Dou | B32B 27/327 |
| 2024/0294682 A1* | 9/2024 | Castro | C08F 4/65927 |

FOREIGN PATENT DOCUMENTS

| | | |
|---|---|---|
| CN | 103649101 A | 3/2014 |
| CN | 104870492 A | 8/2015 |
| CN | 109996820 A | 7/2019 |
| CN | 110483670 A | 11/2019 |
| EP | 1587888 B1 | 6/2006 |
| EP | 2285893 B1 | 9/2011 |
| EP | 1828266 B1 | 7/2015 |
| EP | 3438183 A1 | 2/2019 |
| EP | 3431483 B1 | 3/2021 |
| JP | H10287693 A | 10/1998 |
| JP | 2013204015 A | 10/2013 |
| JP | 2016183334 A | 10/2016 |
| WO | 94/14856 A1 | 7/1994 |
| WO | 95/12622 A1 | 5/1995 |
| WO | 2000008035 A1 | 2/2000 |
| WO | 03/051934 A2 | 6/2003 |
| WO | 2006/097497 A1 | 9/2006 |
| WO | 2015141675 A1 | 9/2015 |

OTHER PUBLICATIONS

International Search Report and Written Opinion mailed Nov. 12, 2021 in International Application No. PCT/EP2021/070757 (15 pages).
Davies et al. Studies on 1,2-phenylenedioxoborylcyclopentadienes and some of their metal (Ti, Zr, Fe) complexes, Polyhedron, 2006, 25(2), 397-405.
Yamazaki et al. Novel high performance ansa-zirconocene catalysts for isospecific polymerization of propylene, Chemistry Letters, 1999, 12, 1311-1312.
International Search Report and Written Opinion mailed Nov. 12, 2021 in International Application No. PCT/EP2021/070763 (15 pages).

* cited by examiner

METALLOCENE COMPLEXES AND CATALYSTS MADE THEREFROM

The invention concerns certain novel metallocene complexes and catalysts made therefrom. The invention also relates to processes for preparing these catalysts. Finally, this invention relates to a process for the preparation of an olefin polymer, such as a polyethylene or polypropylene polymer, especially a polyethylene polymer, using said metallocene catalyst. In particular, the catalyst of use in the invention is one that can be prepared in a one step or two step catalyst preparation process.

BACKGROUND

In multi-stage polymerizations which are used for the preparation of multimodal polymers, different polymer components are produced continuously in each reactor. Typically, in a first reactor a lower molecular weight polymer fraction is prepared and in a subsequent reactor, a higher molecular weight polymer component is produced. Compositional control can also be applied to comonomer content, branching, comonomer type, etc.

The use of multiple reactors having different conditions (physical and chemical) creates stringent demands on the catalyst system employed as the same catalyst system is typically employed in all stages of the polymerisation. The catalyst is typically transferred from the first stage to the second stage and hence needs to function in all stages of the reaction. The catalyst needs to be stable for the entire duration of the multi-stage process. The catalyst needs to operate in the different conditions offered by, inter alia, slurry and gas phase polymerizations.

The catalyst must be capable of producing polymers of lower molecular weight, as well as higher molecular weight. The catalyst must perform well in ethylene homopolymerization and/or polymerizations with low comonomer concentration, as well as in polymerizations with high comonomer concentration (see A. R. Albunia, F. Prades and D. Jeremic, Ed., Multimodal Polymers with Supported Catalysts, Springer 2019, ISBN 978-3-030-03474-0).

Typically, Ziegler-Natta catalysts have been used in multi-stage systems with very good results but these catalysts are not able to produce very specific polymer architecture. On the other hand, single site catalysts such as metallocenes are able to generate very controlled polymer structures. However, it has been very challenging to combine the benefits of single site catalysis with multi-stage processes because it is challenging to find metallocene catalysts that have the required properties, i.e.:

- the catalyst must have good kinetic stability as the catalyst has to polymerize for over several hours of average residence time under different reaction conditions,
- the catalyst must be able to produce polymers with lower $M_w$ and higher $M_w$ in separate reactors;
- the catalyst must have high catalyst activity across all reactors.

The present inventors therefore sought a metallocene catalyst for multi-stage polymerisation that can provide multimodal polymers with, for example:

- high $M_w$;
- high comonomer incorporation;
- good catalyst activity; and
- ability to make lower and higher $M_w$ components in a cascade (facilitated by hydrogen as a $M_w$ regulator).

It is particularly preferred if the activity of the catalyst in the gas phase is high relative to the slurry phase, i.e. the ratio of the gas phase activity/slurry phase activity is high, e.g. 1.8 or more. It is highly preferred therefore if the activity of the catalyst in the gas phase is higher than the slurry phase, e.g. the ratio of the gas phase activity/slurry phase activity is 1.8 to 10, especially 2 to 8, more preferably 2.2 to 6.

It is also desirable to provide catalysts that offer value in unimodal polymerizations, e.g. for polyethylene or polypropylene. In particular, high catalyst activity (especially in slurry) and good comonomer incorporation are important for ethylene polymerisation.

Good $M_w$ capability and stable reaction kinetics are also a target. Higher activity and improved comonomer sensitivity combined with higher $M_w$ capability are crucial for the economically viable performance of a catalyst.

In propylene polymerisation, higher catalyst activity without reduction in $M_w$ is important. Preferably good powder morphology with good isotacticity, low soluble fraction and high melting temperature are also desirable.

Surprisingly, it has been now found that certain bridged bis-cyclopentadienyl type complexes bearing heterocyclic substituents such as furanyl moieties, especially when supported on a carrier, offer the required features.

In particular, the complexes of the invention demonstrate higher activity with an advanced $M_w$ capability combined with an extremely good comonomer incorporation capability. When $H_2$ is added in polymerisation, it is possible to control $M_w$ while still keeping the good catalyst activity, polymer morphology and other key polymer properties. Capability of these inventive catalysts in single and multi-stage process setup is highly favoured due to stable kinetic profiles in slurry phase, similar or higher activity in gas phase and, higher gas phase to slurry phase activity ratio.

The present inventors have identified novel metallocene complexes which have high catalyst activity, high comonomer incorporation and higher $M_w$ capability. The combination of these effects and improved performance make the catalysts of the present invention particularly valuable.

U.S. Pat. No. 6,326,493 describes certain furanyl containing metallocene catalysts but not those claimed herein.

JP 2016/183334 describes a multimodal polyethylene-based resin containing two multimodal polyethylene resins, (C) and (G). The multimodal polyethylenes are prepared in a multi-stage processes.

SUMMARY OF INVENTION

Thus viewed from one aspect the invention provides a racemic metallocene complex of formula (I')

(I')

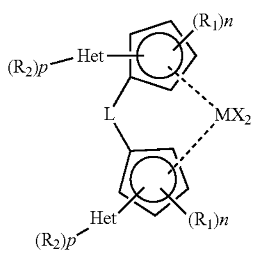

wherein each X is a sigma donor ligand;

L is a carbon, silicon or germanium based divalent bridge in which one or two backbone atoms link the ligands;

M is Ti, Zr or Hf;

each Het is independently a monocyclic or multicyclic heteroaromatic or heterocyclic group containing at least one heteroatom selected from O, N or S;

each $R_1$ is the same or different and is a linear $C_{1-10}$ alkyl group, or linear $C_{1-10}$ alkoxy, each n is 0 to 3;

each $R_2$ is the same or different and is a —Si(RaRbRc) group;

Ra is $C_{1-10}$ alkyl or phenyl group optionally substituted by 1 to 3 $C_{1-6}$ alkyl groups;

Rb is $C_{1-10}$ alkyl or phenyl group optionally substituted by 1 to 3 $C_{1-6}$ alkyl group Rc is a phenyl group optionally substituted by 1 to 3 $C_{1-6}$ alkyl group; and each p is 1 to 3.

Viewed from another aspect the invention provides a racemic metallocene complex of formula (Ia)

(Ia)

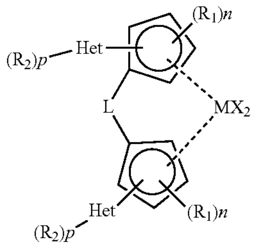

wherein each X is a sigma donor ligand;

each Het is independently a monocyclic or multicyclic heteroaromatic or heterocyclic group containing at least one heteroatom selected from O, N or S;

L is a (RdRe)Si group, a (RdRe)Ge group or a (RdRe)$CH_2$ group;

Rd is a $C_{1-10}$ alkyl group, a $C_{5-10}$-cycloalkyl group, benzyl or phenyl;

Re is a $C_{2-10}$ alkenyl group;

M is Ti, Zr or Hf;

each $R_1$ is the same or different and is a linear $C_{1-10}$ alkyl group or a linear $C_{1-10}$ alkoxy group;

each n is 0 to 3;

each $R_2$ is the same or different and is a $C_{1-10}$ alkyl group, $C_{1-10}$ alkoxy group or —$Si(R)_3$ group;

each R is the same or different and is a $C_{1-10}$ alkyl or phenyl group optionally substituted by 1 to 3 $C_{1-6}$ alkyl groups; and each p is 0 to 3.

Viewed from another aspect the invention provides a racemic metallocene complex of formula (Ia')

(Ia')

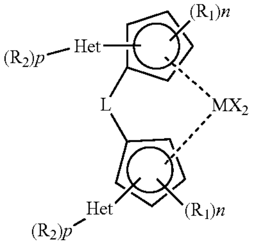

wherein each X is a sigma donor ligand;

each Het is independently a monocyclic or multicyclic heteroaromatic or heterocyclic group containing at least one heteroatom selected from O, N or S;

L is a (RdRe)Si group;

Rd is a $C_{1-10}$ alkyl group;

Re is a $C_{2-10}$ alkenyl group;

M is Ti, Zr or Hf;

each $R_1$ is the same or different and is a linear $C_{1-10}$ alkyl group or a linear $C_{1-10}$ alkoxy; each n is 0 to 3;

each $R_2$ is the same or different and is a $C_{1-10}$ alkyl group, $C_{1-10}$ alkoxy group or —$Si(R)_3$ group;

each R is the same or different and is $C_{1-10}$ alkyl or phenyl group optionally substituted by 1 to 3 $C_{1-6}$ alkyl groups; and each p is 0 to 3.

Viewed from another aspect the invention provides a metallocene catalyst comprising:

(i) a complex of formula (I') or (Ia) as hereinbefore defined;

(ii) a cocatalyst which comprises a compound of a group 13 element; and optionally (iii) a support.

Viewed from another aspect the invention provides a process for the preparation of an olefin polymer, such as a polyethylene or polypropylene polymer comprising polymerising at least one olefin in the presence of a metallocene catalyst as hereinbefore defined.

Viewed from another aspect the invention provides a process for the preparation of a polyethylene comprising polymerising ethylene and optionally at least one C4-10 alpha olefin comonomer in the presence of a metallocene catalyst as hereinbefore defined.

Viewed from another aspect the invention provides a process for the preparation of a multimodal polyethylene polymer comprising:

(I) polymerising ethylene and optionally at least one C4-10 alpha olefin comonomer in a first stage in the presence of (i) a metallocene complex of formula (I') or (Ia) as hereinbefore defined;

(ii) a cocatalyst which comprises a compound of a group 13 element; and optionally (iii) a support;

so as to form a first polyethylene component (e.g. a lower molecular weight component);

(II) polymerising ethylene and optionally at least one C4-10 alpha olefin comonomer in a second stage in the presence of the product of step (I) so as to form a second polyethylene component (e.g. a higher molecular weight component).

Viewed from another aspect the invention provides the use of a metallocene catalyst as hereinbefore defined to prepare an olefin polymer, such as a polyethylene or polypropylene polymer, especially a multimodal ethylene polymer in a process comprising a slurry phase step and a gas phase step.

Definitions

Throughout the description, the following definitions are employed.

The term “molecular weight” is used herein to refer to weight average molecular weight $M_w$ unless otherwise stated.

DETAILED DESCRIPTION OF THE INVENTION

Figure 1:
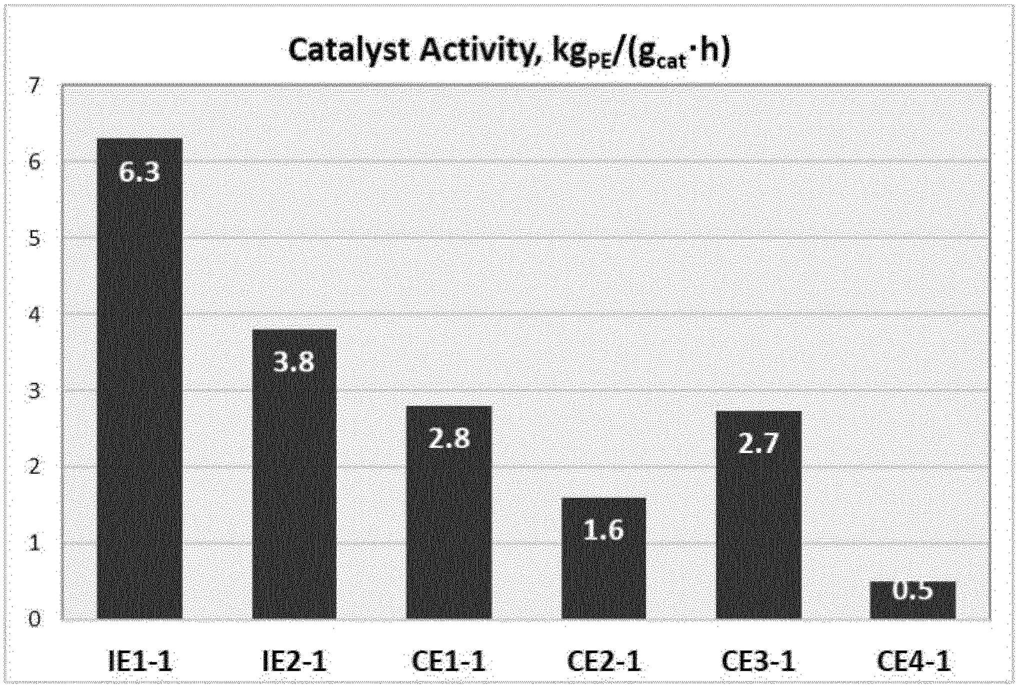
FIG. 1 shows catalyst activity for IC1, IC2, CC1, CC2, CC3 and CC4 in ethylene slurry copolymerisation (examples IE1-1, IE2-1, CE1-1, CE2-1, CE3-1 and CE4-1).

This invention relates metallocene complexes for use in olefin polymerisation and catalysts made therefrom. The invention further relates to a process for the preparation of an olefin polymer such as a polypropylene or polyethylene polymer using said metallocene catalysts.

Metallocene

The metallocene complexes of use in the invention can be either symmetrical or asymmetrical. By asymmetrical means simply that the two ligands forming the metallocene complex are different, that is, each ligand bears a set of substituents that are chemically different. The term symmetrical implies that the two ligands in the metallocene complex are the same, i.e. they bear the same substituent pattern.

The metallocene catalyst complexes of the invention is racemic. The metallocene catalyst complexes of the invention should therefore be chiral, racemic bridged biscyclopentadienyl metallocene complexes in their anti-configuration.

The metallocene catalyst of the invention may contain, in addition to the racemic isomer, some meso or syn isomer. Due to the nature of the synthesis of the metallocene complexes, these might be produced as a mixture. There might be up to 60 mol % of meso isomer and hence a minimum of 40 mol % of the rac isomer in such a mixture.

It is however preferred if the content of the racemic isomer is 50 mol % or more, such as 60 mol % or more, especially 70 mol % or more, ideally 90 mol % or more based on the weight of the complex as a whole.

The metallocene complexes may be C2-symmetric or C1-symmetric. When they are C1-symmetric they still maintain a pseudo-C2-symmetry since they maintain C2-symmetry in close proximity of the metal centre, although not at the ligand periphery. By nature of their chemistry, both a meso form and a racemic enantiomer pair (in case of C2-symmetric complexes) or anti and syn enantiomer pairs (in case of C1-symmetric complexes) are formed during the synthesis of the complexes. For the purpose of this invention, racemic-anti means that the two ligands are oriented in opposite directions with respect to the cyclopentadienyl-metal-cyclopentadienyl plane, while racemic-syn means that the two ligands are oriented in the same direction with respect to the cyclopentadienyl-metal-cyclopentadienyl plane.

The metallocene catalyst complexes of the invention contain a racemic-anti isomer. Ideally, therefore at least 95% mol, such as at least 98% mol, especially at least 99% mol of the metallocene catalyst complex is in the racemic-anti isomeric form.

In the metallocene catalyst complexes of the invention, the following preferences apply. Complexes of invention may have the structure of formula (I'):

(I')

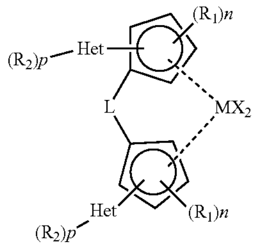

wherein each X is a sigma donor ligand;

L is a carbon, silicon or germanium based divalent bridge in which one or two backbone atoms link the ligands;

M is Ti, Zr or Hf;

each Het is independently a monocyclic or multicyclic heteroaromatic or heterocyclic group containing at least one heteroatom selected from O, N or S;

each $R_1$ is the same or different and is a linear $C_{1-10}$ alkyl group, or linear $C_{1-10}$ alkoxy, each n is 0 to 3;

each $R_2$ is the same or different and is a —Si(RaRbRc) group;

Ra is $C_{1-10}$ alkyl or phenyl group optionally substituted by 1 to 3 $C_{1-6}$ alkyl groups;

Rb is $C_{1-10}$ alkyl or phenyl group optionally substituted by 1 to 3 $C_{1-6}$ alkyl group Rc is a phenyl group optionally substituted by 1 to 3 $C_{1-6}$ alkyl group; and each p is 1 to 3; or a racemic metallocene complex of formula (Ia)

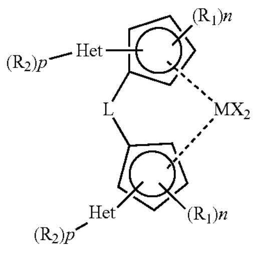
(Ia)

wherein each X is a sigma donor ligand;

each Het is independently a monocyclic or multicyclic heteroaromatic or heterocyclic group containing at least one heteroatom selected from O, N or S;

L is a (RdRe)Si group, (RdRe)Ge or $(RdRe)CH_2$;

Rd is a $C_{1-10}$ alkyl group, $C_{5-10}$-cycloalkyl, benzyl or phenyl;

Re is a $C_{2-10}$ alkenyl group;

M is Ti, Zr or Hf;

each $R_1$ is the same or different and is a linear $C_{1-10}$ alkyl group or a linear $C_{1-10}$ alkoxy;

each n is 0 to 3;

each $R_2$ is the same or different and is a $C_{1-10}$ alkyl group, $C_{1-10}$ alkoxy group or —$Si(R)_3$ group;

each R is the same or different and is a $C_{1-10}$ alkyl or phenyl group optionally substituted by 1 to 3 $C_{1-6}$ alkyl groups; and each p is 0 to 3; such as a racemic metallocene complex of formula (Ia')

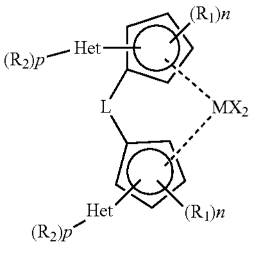
(Ia')

wherein each X is a sigma donor ligand;

each Het is independently a monocyclic or multicyclic heteroaromatic or heterocyclic group containing at least one heteroatom selected from O, N or S;

L is a (RdRe)Si group;

Rd is a $C_{1-10}$ alkyl group;

Re is a $C_{2-10}$ alkenyl group;

M is Ti, Zr or Hf;

each $R_1$ is the same or different and is a linear $C_{1-10}$ alkyl group or a linear $C_{1-10}$ alkoxy;

each n is 0 to 3;

each $R_2$ is the same or different and is a $C_{1-10}$ alkyl group, $C_{1-10}$ alkoxy group or —$Si(R)_3$ group;

each R is the same or different and is $C_{1-10}$ alkyl or phenyl group optionally substituted by 1 to 3 $C_{1-6}$ alkyl groups; and each p is 0 to 3.

The following preferred options apply to all general formulae herein.

M is preferably Zr or Hf, more preferably Zr.

Each X independently is a sigma-donor ligand. Thus each X may be the same or different, and is preferably a hydrogen atom, a halogen atom, a linear or branched, cyclic or acyclic $C_{1-20}$-alkyl or $C_{1-20}$-alkoxy group, a $C_{6-20}$-aryl group, a $C_{7-20}$-alkylaryl group or a $C_{7-20}$-arylalkyl group.

In one embodiment the X group may be trihydrocarbylsilyl, $C_{1-10}$-alkoxy, $C_{1-10}$alkoxy-$C_{1-10}$-alkyl-, or amido group.

The term halogen includes fluoro, chloro, bromo and iodo groups, preferably chloro groups.

Amido groups of interest are —$NH_2$, —$NHC_{1-6}$ alkyl or —$N(C_{1-6}\ alkyl)_2$.

More preferably, each X is independently a hydrogen atom, a halogen atom, a $C_{1-6}$-alkyl, $C_{1-6}$-alkoxy group, amido, phenyl or benzyl group.

Yet more preferably, each X is independently a halogen atom, a linear or branched $C_1$-4-alkyl or $C_{1-4}$-alkoxy group, a phenyl or benzyl group.

Most preferably, each X is independently chlorine, benzyl, cyclohexyl, or a methyl group.

Preferably, both X groups are the same.

The most preferred options for both X groups are two chlorides, two methyl or two benzyl groups, especially two chlorides.

L is a bridge based on carbon, silicon or germanium. There are one to two backbone linking atoms between the two ligands, e.g. a structure such as ligand-C-ligand (one backbone atom) or ligand-Si—Si-ligand (two backbone atoms).

The bridging atoms can carry other groups. For example, suitable bridging ligands L are selected from —$R'_2C$—, —$R'_2C$—$CR'_2$—, —$R'_2Si$—, —$R'_2Si$—$SiR'_2$—, —$R'_2Ge$—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring. In one embodiment R' can be an alkyl having 1 to 10 carbon atoms substituted with alkoxy having 1 to 10 carbon atoms.

The term heteroatoms belonging to groups 14-16 of the periodic table includes for example Si, N, O or S.

Preferably L is —$R'_2Si$—, ethylene or methylene.

In the formula —$R'_2Si$—, each R' is preferably independently a $C_1$-$C_{20}$-hydrocarbyl group. The term $C_{1-20}$-hydrocarbyl group therefore includes $C_{1-20}$-alkyl, $C_{2-20}$-alkenyl, $C_{2-20}$-alkynyl, $C_{3-20}$-cycloalkyl, $C_{3-20}$-cycloalkenyl, $C_{6-20}$-aryl groups, $C_{7-20}$-alkylaryl groups or $C_{7-20}$-arylalkyl groups or of course mixtures of these groups such as cycloalkyl substituted by alkyl. Unless otherwise stated, preferred $C_{1-20}$-hydrocarbyl groups are $C_{1-20}$-alkyl, $C_{2-20}$ alkenyl, $C_{4-20}$-cycloalkyl, $C_{5-20}$-cycloalkyl-alkyl groups, $C_{7-20}$-alkylaryl groups, $C_{7-20}$-arylalkyl groups or $C_{6-20}$-aryl groups.

In one embodiment the formula —$R'_2Si$—, represents silacycloalkanediyls, such as silacyclobutane, silacyclopentane, or 9-silafluorene.

In one embodiment L is (RdRe)Si and Rd is a $C_{1-10}$ alkyl group, $C_{5-10}$-cycloalkyl, benzyl or phenyl and Re is $C_{2-10}$ alkenyl such as L is (RdRe)Si and Rd is a $C_{1-4}$ alkyl group, cyclohexyl, benzyl or phenyl and Re is $C_{4-8}$ alkenyl. For the avoidance of doubt, in a (RdRe)Si group, the Rd and Re groups bind to the Si atom.

In one embodiment, each R' are different. It is preferred if one R' is a $C_{1-10}$ alkyl group, e.g. $C_{1-4}$ alkyl group, especially methyl and one R' is a $C_{2-10}$ alkenyl group, e.g. $C_4$ to 8 alkenyl group. It is preferred if the double bond is located at the terminal of the alkenyl group remote from the Si bridge. Most preferably the bridge is $=Si(CH_3)(-CH_2CH_2CH_2CH=CH_2)$. In another embodiment, both R' groups are the same. It is preferred if R' is a $C_1$-$C_{10}$-hydrocarbyl, or an alkyl having 1 to 10 carbon atoms substituted with alkoxy having 1 to 10 carbon atoms. Preferred R' groups are methyl, ethyl, propyl, isopropyl, tert-butyl, isobutyl, $C_{2-10}$ alkenyl, $C_{3-8}$-cycloalkyl, cyclohexylmethyl, phenyl or benzyl, more preferably each R' are independently a $C_1$-$C_6$-alkyl, $C_{2-10}$ alkenyl, $C_{5-6}$-cycloalkyl or phenyl group, and most preferably both R' are methyl or one is methyl and the other is cyclohexyl. Most preferably the bridge is $-Si(CH_3)_2-$.

The Het groups can be the same or different, preferably the same. The Het group is a monocyclic or multicyclic heteroaromatic or heterocyclic group containing at least one heteroatom selected from O, N or S. If an N is present in a ring, depending on the structure of the ring, it may carry an H or $C_{1-6}$ alkyl group.

Preferably the Het group is monocyclic. Preferably the Het group is heteroaromatic. Preferably the Het group is a monocyclic heteroaromatic group. Preferably the Het group is a 5 or 6 membered heteroaromatic or heterocyclic ring structure.

Preferred Het groups include furanyl, tetrahydrofuranyl, thiophenyl, pyridyl, piperidinyl, or pyrrole.

It is preferred if there is one heteroatom in the Het ring. It is preferred if that heteroatom is O or S, preferably O. It is most preferred if Het is furanyl. It is preferred if the link to the cyclopentadienyl ring from the Het group is on a carbon adjacent to the heteroatom. It is preferred if the link to the Het ring from the Cp group is on a carbon adjacent to the linker L.

Each $R_1$ is the same or different and is a linear $C_{1-10}$ alkyl group, or linear $C_{1-10}$ alkoxy.

Each $R_1$ is preferably a linear $C_{1-6}$ alkyl group, or linear $C_{1-6}$ alkoxy.

More preferably $R_1$ is a methyl or ethyl group.

The subscript "n" is preferably 1 or 2, i.e. it is preferred if the ring is substituted. If n is 2 then it is preferred if $R_1$ is methyl.

If n is more than 1 then it is preferred if $R_1$ groups are not bound to the same C atom.

If n=2 then the $R_1$ groups are preferably adjacent. If n=2 then the $R_1$ groups are preferably attached to a carbon adjacent the bridge L and the next carbon.

If n=1 then the $R_1$ group is preferably not adjacent to the linker L or the Het group.

$R_2$ is preferably an $-Si(RaRbRc)$ group (e.g. $SiR_3$ wherein the three R groups are Ra, Rb and Rc).

Ra is $C_{1-10}$ alkyl or phenyl group optionally substituted by 1 to 3 $C_{1-6}$ alkyl groups, preferably a $C_{1-6}$ alkyl group.

Rb is $C_{1-10}$ alkyl or phenyl group optionally substituted by 1 to 3 $C_{1-6}$ alkyl groups, preferably a $C_{1-6}$ alkyl group.

Rc is $C_{1-10}$ alkyl or phenyl group optionally substituted by 1 to 3 $C_{1-6}$ alkyl groups.

Each p is 0 to 3 or 1 to 3, such as 1 to 2.

Ra, Rb and Rc groups are preferably phenyl or $C_{1-4}$ alkyl, especially methyl or phenyl. In one embodiment one Rc is phenyl and the Ra and Rb groups are $C_{1-4}$ alkyls such as methyl. In another embodiment, all Ra, Rb and Rc groups are $C_{1-4}$ alkyl groups. The use of $-SiPhMe_2$ or $SiMe_3$ is preferred.

It is preferred if p is 0 or 1, more preferably p=1.

If p is other than 0 then the $R_2$ substituent is preferably on a carbon adjacent the heteroatom. It is preferred if the $R_2$ group does not bind to the same carbon atom as the link to the Cp ring. If the Het group is furanyl then it is preferred if the Het ring is linked to the Cp ring and the Het group (if present) via the two carbons adjacent the O.

The racemic complex of use in the invention is preferably of formula (II):

(II)

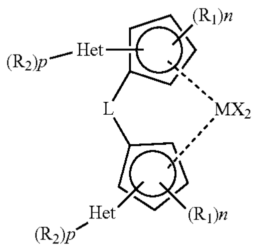

wherein each X is independently a hydrogen atom, a halogen atom, a $C_{1-6}$-alkyl, $C_{1-6}$-alkoxy group, amido, phenyl or benzyl group;

each Het is independently a monocyclic or multicyclic heteroaromatic or heterocyclic group containing at least one heteroatom selected from O, N or S;

L is $-R'_2C-$, or $-R'_2Si-$, wherein each R' is independently $C_{1-20}$ hydrocarbyl or $C_{1-10}$ alkyl substituted with alkoxy having 1 to 10 carbon atoms;

M is Ti, Zr or Hf;

each $R_1$ is the same or different and is a linear $C_{1-10}$ alkyl group or linear $C_{1-10}$ alkoxy, each n is 0 to 3;

each $R_2$ is the same or different and is a $-Si(RaRbRc)$ group;

Ra is $C_{1-10}$ alkyl or phenyl group optionally substituted by 1 to 3 $C_{1-6}$ alkyl groups;

Rb is $C_{1-10}$ alkyl or phenyl group optionally substituted by 1 to 3 $C_{1-6}$ alkyl groups;

Rc is $C_{1-10}$ alkyl or phenyl group optionally substituted by 1 to 3 $C_{1-6}$ alkyl groups;

each p is 0 to 3;

wherein if L is other than an (RdRe)Si group; where Rd is a $C_{1-10}$ alkyl group and Re is a $C_{2-10}$ alkenyl group then Rc is a phenyl group optionally substituted by 1 to 3 $C_{1-6}$ alkyl groups and p is 1 to 3.

Ideally in formula (II), $R_1$ is a linear $C_{1-6}$ alkyl group, such as methyl.

The racemic complex of use in the invention is preferably of formula (III):

(III)

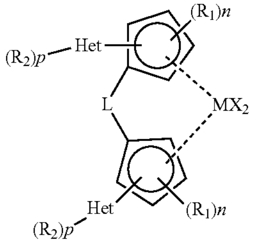

wherein each X is independently a hydrogen atom, a halogen atom, a $C_{1-6}$-alkyl, $C_{1-6}$-alkoxy group, amido, phenyl or benzyl group;

each Het is independently a monocyclic heteroaromatic or heterocyclic group containing at least one heteroatom selected from O, N or S;

L is —$R'_2C$—, or —$R'_2Si$—, wherein each R' is independently $C_{1-20}$ hydrocarbyl or $C_{1-10}$ alkyl substituted with alkoxy having 1 to 10 carbon atoms;

M is Ti, Zr or Hf;

each $R_1$ is the same or different and is a linear $C_{1-10}$ alkyl group, or linear $C_{1-10}$ alkoxy;

each n is 0 to 3;

each $R_2$ is the same or different and is a —Si(RaRbRc) group;

Ra is $C_{1-6}$ alkyl or phenyl group optionally substituted by 1 to 3 $C_{1-6}$ alkyl groups;

Rb is $C_{1-6}$ alkyl or phenyl group optionally substituted by 1 to 3 $C_{1-6}$ alkyl groups;

Rc is $C_{1-6}$ alkyl or phenyl group optionally substituted by 1 to 3 $C_{1-6}$ alkyl groups;

each p is 0 to 3;

wherein if L is other than an (RdRe)Si group; where Rd is a $C_{1-10}$ alkyl group and Re is a $C_{2-10}$ alkenyl group then Rc is a phenyl group optionally substituted by 1 to 3 $C_{1-6}$ alkyl groups and p is 1 to 3.

Ideally in formula (III), $R_1$ is a linear $C_{1-6}$ alkyl group, such as methyl.

The racemic complex of use in the invention is preferably of formula (IV):

(IV)

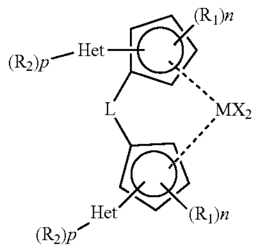

wherein each X is independently a hydrogen atom, a halogen atom, a $C_{1-6}$-alkyl, $C_{1-6}$-alkoxy group, amido, phenyl or benzyl group;

each Het is independently a monocyclic heteroaromatic group containing at least one heteroatom selected from O, N or S;

L is —$R'_2C$—, or —$R'_2Si$—, wherein each R' is independently $C_{1-20}$ hydrocarbyl or $C_{1-10}$ alkyl substituted with alkoxy having 1 to 10 carbon atoms;

M is Ti, Zr or Hf;

each $R_1$ is the same or different and is a linear $C_{1-6}$ alkyl group, or linear $C_{1-6}$ alkoxy group;

each n is 0 to 3;

each $R_2$ is the same or different and is a —Si(RaRbRc) group;

Ra is $C_{1-6}$ alkyl or phenyl group optionally substituted by 1 to 3 $C_{1-6}$ alkyl groups;

Rb is $C_{1-6}$ alkyl or phenyl group optionally substituted by 1 to 3 $C_{1-6}$ alkyl groups;

Rc is $C_{1-6}$ alkyl or phenyl group optionally substituted by 1 to 3 $C_{1-6}$ alkyl groups;

each p is 0 to 3;

wherein if L is other than an (RdRe)Si group; where Rd is a $C_{1-10}$ alkyl group and Re is a $C_{2-10}$ alkenyl group then Rc is a phenyl group optionally substituted by 1 to 3 $C_{1-6}$ alkyl groups and p is 1 to 3.

Ideally in formula (IV), $R_1$ is a linear $C_{1-6}$ alkyl group, such as methyl.

The racemic complex of use in the invention is preferably of formula (V):

(V)

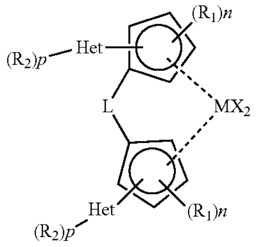

wherein each X is independently a hydrogen atom, a halogen atom, a $C_{1-6}$-alkyl, $C_{1-6}$-alkoxy group, amido, phenyl or benzyl group;

each Het is independently a monocyclic heteroaromatic or heterocyclic group containing at least one heteroatom selected from O or S;

L is —$R'_2Si$—, wherein each R' is independently $C_{1-20}$ hydrocarbyl or $C_{1-10}$ alkyl substituted with alkoxy having 1 to 10 carbon atoms;

M is Ti, Zr or Hf;

each $R_1$ is the same or different and is a linear $C_{1-6}$ alkyl group or linear $C_{1-6}$ alkoxy group;

each n is 1 to 2;

each $R_2$ is the same or different and is a —Si(RaRbRc) group;

Ra is $C_{1-6}$ alkyl or phenyl group optionally substituted by 1 to 3 $C_{1-6}$ alkyl groups;

Rb is $C_{1-6}$ alkyl or phenyl group optionally substituted by 1 to 3 $C_{1-6}$ alkyl groups;

Rc is $C_{1-6}$ alkyl or phenyl group optionally substituted by 1 to 3 $C_{1-6}$ alkyl groups;

each p is 0 to 1;

wherein if L is other than a (RdRe)Si group; where Rd is a $C_{1-10}$ alkyl group and Re is a $C_{2-10}$ alkenyl group then Rc is a phenyl group optionally substituted by 1 to 3 $C_{1-6}$ alkyl groups and p is 1.

Ideally in formula (V), $R_1$ is a linear $C_{1-6}$ alkyl group, such as methyl.

The racemic complex of use in the invention is preferably of formula (VI):

(VI)

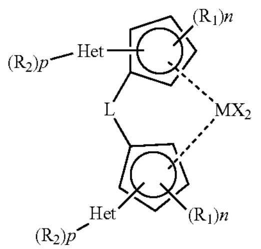

wherein each X is independently a hydrogen atom, a halogen atom, a $C_{1-6}$-alkyl, $C_{1-6}$-alkoxy group, amido, phenyl or benzyl group;

each Het is independently a monocyclic heteroaromatic or heterocyclic group containing at least one heteroatom selected from O or S;

L is —$R'_2Si$—, wherein each R' is independently $C_{1-10}$ alkyl, $C_{3-8}$ cycloalkyl or $C_{2-10}$ alkenyl;

M is Ti, Zr or Hf;

each $R_1$ is the same or different and is a linear $C_{1-6}$ alkyl group;

each n is 1 to 2;

each $R_2$ is the same or different and is a —Si(RaRbRc) group;

Ra is $C_{1-6}$ alkyl or phenyl group optionally substituted by 1 to 3 $C_{1-6}$ alkyl groups;

Rb is $C_{1-6}$ alkyl or phenyl group optionally substituted by 1 to 3 $C_{1-6}$ alkyl groups;

Rc is $C_{1-6}$ alkyl or phenyl group optionally substituted by 1 to 3 $C_{1-6}$ alkyl groups;

each p is 0 to 1;

wherein if L is other than a (RdRe)Si group; where Rd is a $C_{1-10}$ alkyl group and Re is a $C_{2-10}$ alkenyl group then Rc is a phenyl group optionally substituted by 1 to 3 $C_{1-6}$ alkyl groups and p is 1.

Ideally in formula (VI), $R_1$ is a linear $C_{1-6}$ alkyl group, such as methyl.

The racemic complex of use in the invention is preferably of formula (VII)

(VII)

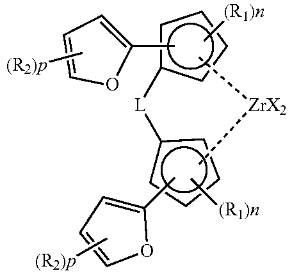

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a carbon, silicon or germanium based divalent bridge in which one or two backbone atoms link the ligands such as —$R'_2Si$—, wherein each R' is independently $C_{1-20}$ hydrocarbyl or $C_{1-10}$ alkyl substituted with alkoxy having 1 to 10 carbon atoms;

each $R_1$ is the same or different and is a linear $C_{1-6}$ alkyl group, such as methyl;

each n is 0 to 3;

each $R_2$ is the same or different and is a —Si(RaRbRc) group;

Ra is $C_{1-6}$ alkyl or phenyl group optionally substituted by 1 to 3 $C_{1-6}$ alkyl groups;

Rb is $C_{1-6}$ alkyl or phenyl group optionally substituted by 1 to 3 $C_{1-6}$ alkyl groups;

Rc is $C_{1-6}$ alkyl or phenyl group optionally substituted by 1 to 3 $C_{1-6}$ alkyl groups;

each p is 0 to 1;

wherein if L is other than a (RdRe)Si group; where Rd is a $C_{1-10}$ alkyl group and Re is a $C_{2-10}$ alkenyl group then Rc is a phenyl group optionally substituted by 1 to 3 $C_{1-6}$ alkyl groups and p is 1.

The racemic complex of use in the invention is preferably of formula (VIII)

(VIII)

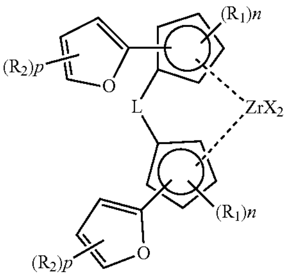

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a carbon, silicon or germanium based divalent bridge in which one or two backbone atoms link the ligands such as —$R'_2Si$—, wherein each R' is independently $C_{1-20}$ hydrocarbyl or $C_{1-10}$ alkyl substituted with alkoxy having 1 to 10 carbon atoms;

each $R_1$ is the same or different and is a linear $C_{1-6}$ alkyl group, such as methyl;

each n is 1 to 2;

each $R_2$ is the same or different and is a —Si(RaRbRc) group;

Ra is $C_{1-6}$ alkyl or phenyl group optionally substituted by 1 to 3 $C_{1-6}$ alkyl groups;

Rb is $C_{1-6}$ alkyl or phenyl group optionally substituted by 1 to 3 $C_{1-6}$ alkyl groups;

Rc is $C_{1-6}$ alkyl or phenyl group optionally substituted by 1 to 3 $C_{1-6}$ alkyl groups;

each p is 0 to 1;

wherein if L is other than a (RdRe)Si group; where Rd is a $C_{1-10}$ alkyl group and Re is a $C_{2-10}$ alkenyl group then Rc is a phenyl group optionally substituted by 1 to 3 $C_{1-6}$ alkyl groups and p is 1.

The racemic complex of use in the invention is preferably of formula (IX)

(IX)

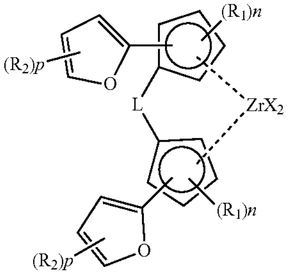

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a $Me_2Si$— or (Me) $C_{2-10}$-alkenylSi;

each $R_1$ is the same or different and is a $C_{1-6}$ alkyl group, e.g. methyl;

each n is 1 to 2;

each $R_2$ is the same or different and is a —Si(RaRbRc) group;

Ra is $C_{1-6}$ alkyl or phenyl group;

Rb is $C_{1-6}$ alkyl or phenyl group;

Rc is $C_{1-6}$ alkyl or phenyl group;

each p is 1;

wherein if L is other than (Me) $C_{2-10}$-alkenylSi then Rc is a phenyl group;

such as of formula (IX')

(IX')

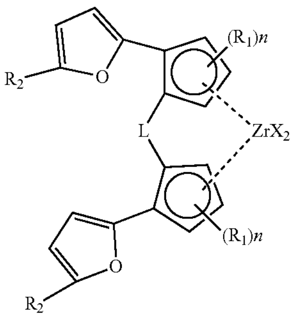

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a $Me_2Si$— or (Me) $C_{2-10}$-alkenylSi;

each $R_1$ is the same or different and is a linear $C_{1-6}$ alkyl group, e.g. methyl;

each n is 1 to 2;

each $R_2$ is the same or different and is a —Si(RaRbRc) group;

Ra is $C_{1-6}$ alkyl or phenyl group;

Rb is $C_{1-6}$ alkyl or phenyl group;

Rc is $C_{1-6}$ alkyl or phenyl group;

wherein if L is $(Me)_2Si$ then Rc is a phenyl group.

Preferred novel complexes are racemic complexes of formula (X)

(X)

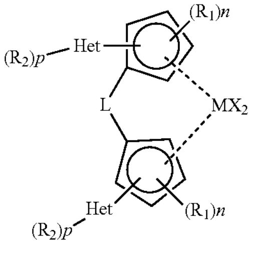

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a carbon, silicon or germanium based divalent bridge in which one or two backbone atoms link the ligands such as —$R'_2Si$—, wherein each R' is independently $C_{1-20}$ hydrocarbyl or $C_{1-10}$ alkyl substituted with alkoxy having 1 to 10 carbon atoms;

M is Ti, Zr or Hf;

each Het is independently a monocyclic heteroaromatic or heterocyclic group containing at least one heteroatom selected from O, N or S;

each $R_1$ is the same or different and is a linear $C_{1-10}$ alkyl group, such as methyl;

each n is 1 to 3;

each $R_2$ is the same or different and is a —Si(RaRbRc) group;

Ra is $C_{1-6}$ alkyl;

Rb is $C_{1-6}$ alkyl;

Rc is a phenyl group optionally substituted by 1 to 3 $C_{1-6}$ alkyl group; and each p is 1 to 3; such as of formula (X')

(X')

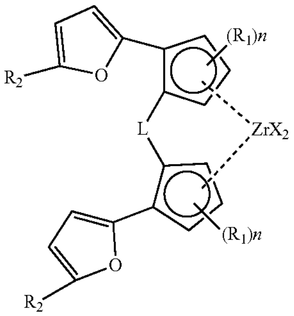

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a carbon, silicon or germanium based divalent bridge in which one or two backbone atoms link the ligands such as —$R'_2Si$—, wherein each R' is independently $C_{1-20}$ hydrocarbyl or $C_{1-10}$ alkyl substituted with alkoxy having 1 to 10 carbon atoms;

each $R_1$ is the same or different and is a linear $C_{1-10}$ alkyl group, such as methyl;

each n is 1 to 3;

each $R_2$ is the same or different and is a —Si(RaRbRc) group;

Ra is $C_{1-6}$ alkyl;

Rb is $C_{1-6}$ alkyl;

Rc is a phenyl group optionally substituted by 1 to 3 $C_{1-6}$ alkyl group.

Ideally in formula (X or X'), $R_1$ is a linear $C_{1-6}$ alkyl group.

Even more preferred novel complexes are those of formula (XII)

(XII)

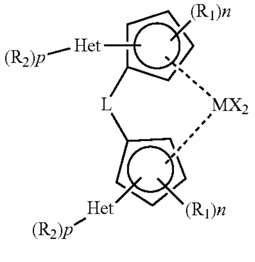

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

each Het is independently a monocyclic heteroaromatic group containing at least one heteroatom selected from O, N or S;

L is a (RdRe)Si group;

Rd is a $C_{1-10}$ alkyl group;

Re is a $C_{2-10}$ alkenyl group;

M is Ti, Zr or Hf;

each $R_1$ is the same or different and is a linear $C_{1-10}$ alkyl group, such as methyl;

each n is 1 to 3;

each $R_2$ is the same or different and is a —$Si(R)_3$ group;

each R is $C_{1-10}$ alkyl or phenyl group optionally substituted by 1 to 3 $C_{1-6}$ alkyl groups; and each p is 0 to 3, such as of formula (XII')

(XII')

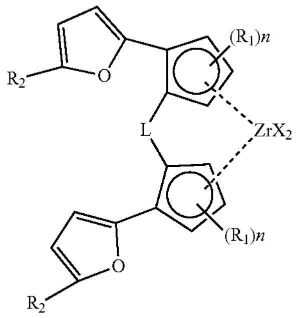

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a (RdRe)Si group;

Rd is a $C_{1-10}$ alkyl group;

Re is a $C_{2-10}$ alkenyl group;

each $R_1$ is the same or different and is a linear $C_{1-10}$ alkyl group, such as methyl;

each n is 1 to 3;

each $R_2$ is the same or different and is a —$Si(R)_3$ group;

each R is $C_{1-10}$ alkyl or phenyl group optionally substituted by 1 to 3 $C_{1-6}$ alkyl groups.

Ideally in formula (XII or XII'), $R_1$ is a linear $C_{1-6}$ alkyl group, such as methyl.

Highly preferred complexes are

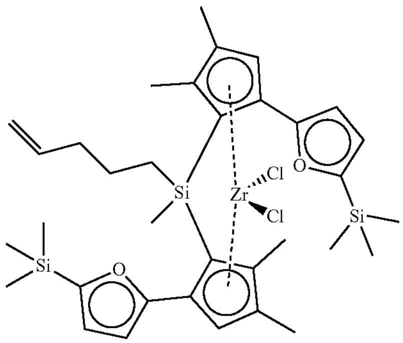

-continued

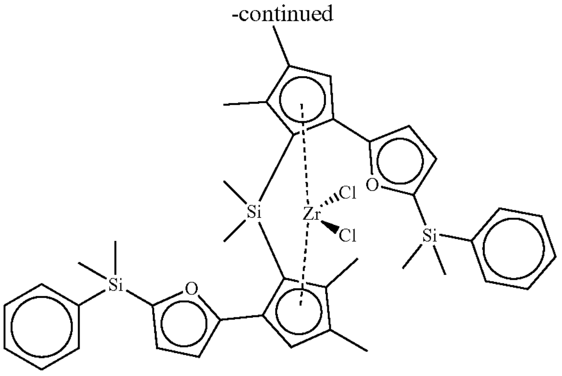

Metallocenes of the invention can be prepared using known synthetic chemical methods similar to those outlined in U.S. Pat. No. 6,326,493 and in the examples section which follows.

Cocatalyst

To form an active catalytic species it is normally necessary to employ a cocatalyst as is well known in the art.

According to the present invention, a cocatalyst comprising a group 13 element is required such as a boron-containing cocatalyst or an Al containing cocatalyst. The use of an aluminoxane cocatalyst in combination with the above defined metallocene catalyst complexes is most preferred.

The aluminoxane cocatalyst can be one of formula (A):

(A)

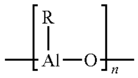

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$-alkyl, preferably $C_1$-$C_5$-alkyl, or $C_3$-$C_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy. The resulting oxygen-containing aluminoxanes are not in general pure compounds but mixtures of oligomers of the formula (A).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

A boron-containing cocatalyst may also be used, optionally in combination with the aluminoxane cocatalyst. Boron-containing cocatalysts of interest include those of formula (B):

$$BY_3 \qquad (B)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5-di(trifluoromethyl)phenyl. Preferred options are trifluoroborane, tris(4-fluorophenyl) borane, tris(3,5-difluorophenyl) borane, tris(4-fluoromethylphenyl) borane, tris(2,4,6-trifluorophenyl) borane, tris(penta-fluorophenyl) borane, tris(3,5-difluorophenyl) borane and/or tris (3,4,5-trifluorophenyl) borane.

Particular preference is given to tris(pentafluorophenyl) borane.

However it is preferred that borates are used, i.e. compounds containing a borate.

These compounds generally contain an anion of formula (C):

$$(Z)_4B^- \quad (C)$$

where Z is an optionally substituted phenyl derivative, said substituent being a halo-$C_1$-6-alkyl or halo group. Preferred options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl) borate.

Suitable cationic counter-ions include triphenylcarbenium and are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:

tributylammoniumtetrakis(pentafluorophenyl)borate,
tributylammoniumtetrakis(trifluoromethylphenyl)borate,
tributylammoniumtetrakis(4-fluorophenyl)borate,
N,N-dimethylcyclohexylammoniumtetrakis(pentafluorophenyl)borate,
N,N-dimethylbenzylammoniumtetrakis(pentafluorophenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl)borate,
N,N-dimethylaniliniumtetrakis(pentafluorophenyl)borate,
N,N-dimethylcyclohexylammoniumtetrakis(pentafluorophenyl)borate or
N,N-dimethylbenzylammoniumtetrakis(pentafluorophenyl)borate.

Preferred borates of use in the invention therefore comprise the trityl, i.e. triphenylcarbenium ion. Thus, the use of $Ph_3CB(PhF_5)_4$ and analogues therefore are especially favoured.

Suitable amounts of cocatalyst will be well known to the person skilled in the art.

Preferably, the amount of cocatalyst is chosen to reach below defined molar ratios.

The molar ratio of feed amounts of boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol.

Even more preferably, the molar ratio of feed amounts of boron (B) to metal ion (M) (preferably zirconium) of the metallocene boron/M is from 0.3:1 to 3:1

The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

Catalyst System

The metallocene complex as described above is used in combination with a suitable cocatalyst combination as described above.

It is possible to use the catalyst system of the invention in solid but unsupported form following the protocols in WO03/051934. The catalyst system of the invention is preferably used in solid supported form. The particulate support material used is preferably an inorganic porous support such as a silica, alumina or a mixed oxide such as silica-alumina, in particular silica.

The use of a silica support is preferred.

Especially preferably, the support is a porous material so that the complex may be loaded into the pores of the particulate support, e.g. using a process analogous to those described in WO94/14856, WO95/12622, WO2006/097497 and EP1828266.

The average particle size of the support such as silica support can be typically from 10 to 100 μm.

The average pore size of the support such as silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The catalyst can contain from 5 to 500 μmol, such as 10 to 100 μmol of transition metal per gram of support such as silica, and 3 to 15 mmol of Al per gram of support such as silica.

One-Step Catalyst Preparation

In order to prepare a catalyst of use in the invention, the metallocene complex, cocatalyst and the support need to be combined. In a preferred embodiment, the process for combining all these components occurs in a single step.

It is therefore preferred if a solution is prepared in which the metallocene complex and cocatalyst are combined in a solvent, usually under an inert atmosphere. Preferred solvents are hydrocarbons such as toluene and xylene.

The obtained solution is then added, preferably rapidly, to the support, such as a silica support. The resulting crude catalyst is then gently mixed and left to stand before drying. Washings steps can be used, if required.

The solution of metallocene complex and cocatalyst is preferably added dropwise to the support, ideally over a short period of time such as less than 10 minutes.

The total impregnable solution volume is preferably less than to slightly above the pore volume specification of the support so as to effect impregnation in "dry mixing"/"pore filling"/"incipient wetness" mode.

The contacting step ideally occurs at a temperature of 10 to 30° C. This step is often exothermic.

Thus viewed from one aspect the invention provides a process for the preparation of a metallocene catalyst comprising:

(I) contacting a solid support with a solution of a cocatalyst comprising a compound of a group 13 element and a racemic metallocene complex as hereinbefore defined so as to form a supported catalyst.

When the supported catalyst is prepared in this one-step process, we have found that certain surprising technical effects are observed.

Catalyst Activity of the preferred furyl-substituted metallocenes is high in slurry phase compared to other metallocene catalysts such as based on Bis(1-methyl-3-n-butylcyclopentadienyl) zirconium dichloride.

Co-monomer response is higher.

Molecular weight capability is high

Regulation of MFR with hydrogen is effected without significant loss of catalyst activity.

Polymer particle morphology is excellent (good bulk density of polymer)

Significantly lower density of polymer

Stable kinetic profiles, suitable for a multi-stage process.

Reduced polymer long chain branching.

Key here is the combination of comonomer sensitivity, $M_w$ capability and good activity with higher gas phase to slurry phase activity ratio.

Two-Step Catalyst Preparation

In a second embodiment, the contact between the support, metallocene complex and the cocatalyst takes place in a stepwise manner. In a first step, the support, such as silica support, is contacted with the cocatalyst. Typically therefore, a solution of the cocatalyst in a solvent is brought into contact with the support. Solvents of interest are again hydrocarbon solvents such as toluene and xylene. The temperature at which this contact step is carried out is ideally room temperature or lower, e.g. −10 to 25° C. The contact step might be effected under an inert atmosphere.

Once the cocatalyst has been allowed to impregnate the support (e.g. after stirring the mixture for a period) the system is preferably heated to at least 70° C. whilst the impregnation process continues, such as 70 to 120° C. The system is then allowed to settle (preferably still at the elevated temperature) and the supernatant is removed.

The impregnated support can then be washed with more solvent, ideally at elevated temperature once more, before solvent is removed. Washing steps can be repeated, perhaps with each washing step been effected at a lower temperature than the previous step, before drying.

The resulting impregnated support, e.g. in dry form, is then brought into contact with the metallocene complex. This is conveniently provided as a solution, ideally in the same solvent that was used in the manufacture of the impregnated support. The metallocene complex is allowed to impregnate the support before the solvent is removed to leave a dry supported catalyst. Washing steps can again be employed. This second step may take place at a temperature of 20-60° C.

Thus viewed from one aspect the invention provides a process for the preparation of a metallocene catalyst comprising:

(I) contacting a solid support with a solution of a cocatalyst comprising a compound of a group 13 element; so as to form a cocatalyst impregnated support;

(II) contacting said cocatalyst impregnated support with a racemic metallocene complex as hereinbefore defined;

so as to form a supported catalyst.

Olefin Polymer

The present invention also concerns the preparation of an olefin polymer such as a polyethylene or polypropylene polymer using the catalysts of the invention. In particular, the olefin polymer is a polyethylene polymer such as a unimodal or multimodal polyethylene homopolymer or copolymer using the catalysts of the invention.

The density of an ethylene homopolymer or copolymer may be between 900 and 980 kg/$m^3$.

It is preferred if the polyethylene polymer is a copolymer. More preferably, the polyethylene copolymer is an LLDPE. It may have a density of 905 to 940 kg/$m^3$, preferably 910 to 935 kg/$m^3$, more preferably 915 to 930 kg/$m^3$, especially of 916 to 928 kg/$m^3$. In one embodiment a range of 910 to 928 kg/$m^3$ is preferred. The term LLDPE means linear low density polyethylene herein.

The LLDPE is preferably multimodal. The term "multimodal" includes polymers that are multimodal with respect to MFR and includes also therefore bimodal polymers. The term "multimodal" may also mean multimodality with respect to the "comonomer distribution".

Usually, a polymer comprising at least two polyethylene fractions, which have been produced under different polymerisation conditions resulting in different (weight average) molecular weights and molecular weight distributions for the fractions, is referred to as "multimodal". The prefix "multi" relates to the number of different polymer fractions present in the polymer. Thus, for example, the term multimodal polymer includes so called "bimodal" polymers consisting of two fractions. The form of the molecular weight distribution curve, i.e. the appearance of the graph of the polymer weight fraction as a function of its molecular weight, of a multimodal polymer, e.g. LLDPE, may show two or more maxima or at least be distinctly broadened in comparison with the curves for the individual fractions. Often the final MWD curve will be broad, skewered or displaying a shoulder.

Ideally, the molecular weight distribution curve for multimodal polymers produced using the metallocene catalysts of the invention will show two distinct maxima. Alternatively, the polymer fractions have similar MFR and are bimodal in the comonomer content. A polymer comprising at least two polyethylene fractions, which have been produced under different polymerisation conditions resulting in different comonomer content for the fractions, is also referred to as "multimodal".

For example, if a polymer is produced in a sequential multi-stage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In any multimodal polymer, there may be a lower molecular weight component (LMW) and a higher molecular weight component (HMW). The LMW component has a lower molecular weight than the higher molecular weight component. This difference is preferably at least 5000 g/mol.

The unimodal or multimodal polyethylene polymer prepared according to the invention preferably comprises at least one C4-10-comonomer. Comonomers may be present in the HMW component (or second component) or the LMW component (or first component) or both. From hereon, the term LMW/HMW component will be used but the described embodiments apply to the first and second components respectively.

It is preferred if the HMW component comprises at least one C4-10-comonomer. The LMW component may then be an ethylene homopolymer or may also comprise at least one C4-10-comonomer. In one embodiment, the multimodal polyethylene polymer contains a single comonomer. In a preferred embodiment, the multimodal polyethylene polymer comprises at least two, e.g. exactly two, C4-10 comonomers.

In one embodiment, the multimodal polyethylene polymer is a terpolymer and comprises at least two C4-10-comonomers. In that scenario, the HMW component may be a copolymer component or terpolymer component and the lower molecular weight (LMW) component can be an ethylene homopolymer component or copolymer component. Alternatively, both LMW and HMW components can be copolymers such that at least two C4-10-comonomers are present.

The multimodal polyethylene polymer may therefore be one in which the HMW component comprises repeat units deriving from ethylene and at least two other $C_{4-10}$ alpha olefin monomers such as 1-butene and one $C_{6-10}$ alpha olefin monomer. Ethylene preferably forms the majority of the LMW or HMW component. In the most preferred embodiment, the LMW component may comprise an ethylene 1-butene copolymer and the HMW component may comprise an ethylene 1-hexene copolymer.

The overall comonomer content in the polyethylene polymer may be for example 0.5 to 8.0% by mol, preferably 0.7 to 6.5% by mol, more preferably 1.0 to 5.0% by mol and most preferably 1.5 to 5.0% by mol.

1-Butene may be present in an amount of 0.2 to 2.5% by mol, such as 0.4 to 2% by mol, more preferably 0.4 to 1.5% by mol and most preferably 0.4 to 1% by mol.

The C6 to C10 alpha olefin may be present in an amount of 0.3 to 5.5% by mol, preferably 0.4 to 4.5% by mol, more preferably 0.7 to 4.5% by mol.

Preferably, the LMW component has lower amount (mol %) of comonomer than the HMW component, e.g. the amount of comonomer, preferably of 1-butene in the LMW component is from 0.05 to 0.9 mol %, more preferably from 0.1 to 0.8 mol %, whereas the amount of comonomer, preferably of 1-hexene in the HMW component (B) is from 1.0 to 8.0 mol %, more preferably from 1.2 to 7.5 mol %.

If required the comonomer content (mol %) in the HMW component=(comonomer content (mol %) in final product−(weight fraction of LMW component*comonomer content (mol %) in LMW component))/(weight fraction of HMW component).

The multimodal polyethylene copolymer may therefore be formed from ethylene along with at least one of 1-butene, 1-hexene or 1-octene. The multimodal polyethylene polymer may be an ethylene butene hexene terpolymer, e.g, wherein the HMW component is an ethylene butene hexene terpolymer and the LMW is an ethylene homopolymer component. The use of a terpolymer of ethylene with 1-butene and 1-octene comonomers, or a terpolymer of ethylene with 1-octene and 1-hexene comonomers is also envisaged.

In a further embodiment, the multimodal polyethylene copolymer may comprise two ethylene copolymers, e.g. such as two ethylene butene copolymers or an ethylene butene copolymer (e.g. as the LMW component) and an ethylene hexene copolymer (e.g. as the HMW component). It would also be possible to combine an ethylene copolymer component and an ethylene terpolymer component, e.g. an ethylene butene copolymer (e.g. as the LMW component) and an ethylene butene hexene terpolymer (e.g. as the HMW component).

The LMW component of the multimodal polyethylene polymer may have a MFR2 of 0.5 to 3000 g/10 min, more preferably 1.0 to 1000 g/10 min. In some embodiments, the MFR2 of the LMW component may be 50 to 3000 g/10 min, more preferably 100 to 1000 g/10 min, e.g. where the target is a cast film. In some embodiments, the MFR2 of the LMW component may be 0.5 to 50 g/10 min, more preferably 1.0 to 10 g/10 min, preferably of 1.5 to 9.0 and more preferably of 2.0 to 8.5, e.g. where the target is a blown film.

The molecular weight of the low molecular weight component should preferably range from 20,000 to 90,000, e.g. 60,000 to 90,000.

It may have a density of at least 925 $kg/m^3$, e.g. at least 940 $kg/m^3$. A density in the range of 930 to 950, preferably of 935 to 945 $kg/m^3$ is possible.

The HMW component of the multimodal polyethylene polymer may, for example, have an MFR2 of less than 1 g/10 min, such as 0.2 to 0.9 g/10 min, preferably of 0.3 to 0.8 and more preferably of 0.4 to 0.7 g/10 min. It may have a density of less than 915 $kg/m^3$, e.g. less than 910 $kg/m^3$, preferably less than 905 $kg/m^3$. The $M_w$ of the higher molecular weight component may range from 100,000 to 1,000,000, preferably 250,000 to 500,000.

The LMW component may form 30 to 70 wt % of the multimodal polyethylene polymer such as 40 to 60 wt %, especially 45 to 55 wt %.

The HMW component may form 30 to 70 wt % of the multimodal polyethylene polymer such as 40 to 60 wt %, especially 45 to 55 wt %.

In one embodiment, there is 40 to 45 wt % of the LMW component and 60 to 55 wt % of the HMW component.

In one embodiment, the polyethylene polymer consists of the HMW and LMW components as the sole polymer components.

The multimodal polyethylene polymer may have a MFR2 of 0.01 to 50 g/10 min, preferably 0.05 to 25 g/10 min, especially 0.1 to 10 g/10 min.

The multimodal polyethylene polymer may have a density of 900 to 960 $kg/m^3$, preferably 905 to 940 $kg/m^3$, especially 910 to 935 $kg/m^3$.

The molecular weight distribution (MWD, $M_w/M_n$) of a polyethylene terpolymer is in a range of 2.0 to 15.0, preferably in a range of 2.2 to 10.0 and more preferably in a range of 2.4 to 4.6.

The multimodal (e.g. bimodal) polyethylene polymers are prepared by in-situ blending in a multi-stage polymerisation process. In particular, the process requires (I) polymerising ethylene and optionally at least one $C_{4-10}$ alpha olefin comonomer in a first stage in the presence of a metallocene catalyst so as to form a first polyethylene component; and (II) polymerising ethylene and optionally at least one $C_{4-10}$ alpha olefin comonomer in a second stage in the presence of the product of step (I) so as to form a second component.

The olefin polymer may be produced in any suitable polymerisation process known in the art where polymerisation is typically carried out in solution, slurry, bulk or gas phase. Preferably a multimodal polymer, is produced in at least two-stage polymerisation using, for example, two slurry reactors or two gas phase reactors, or any combinations thereof, in any order can be employed. Preferably however, the multimodal polymer is made using a slurry polymerisation, e.g. in a loop reactor followed by a gas phase polymerisation in a gas phase reactor.

A loop reactor—gas phase reactor system is marketed by *Borealis* as a BORSTAR reactor system. Any multimodal polyethylene polymer present is thus preferably formed in a two-stage process comprising a first slurry loop polymerisation followed by gas phase polymerisation.

The conditions used in such a process are well known. For slurry reactors, the reaction temperature will generally be in the range 60 to 110° C. (e.g. 85-110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range-70 to +100° C., e.g. propane. In such reactors, polymerisation may if desired be effected under supercritical conditions. Slurry polymerisation may also be carried out in bulk where the reaction medium is formed from the monomer being polymerised.

The ethylene content in the fluid phase of the slurry may be from 2 to about 50% by mol, preferably from about 2 to about 20% by mol and in particular from about 3 to about 12% by mol. Hydrogen may be fed into the reactor to control the molecular weight of the polymer as known in the art For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

Preferably, the lower molecular weight polymer fraction is produced in a continuously operating loop reactor where ethylene and any comonomers are polymerised in the presence of the polymerisation catalyst as stated above and a chain transfer agent such as hydrogen. The diluent is typically an inert aliphatic hydrocarbon, preferably isobutane or propane.

The higher molecular weight component can then be formed in a gas phase reactor using the same catalyst.

It is also possible for a further polymerisation step to be used such as a further gas phase step.

It is often preferred to remove the reactants of the preceding polymerisation stage from the polymer before introducing it into the subsequent polymerisation stage. This is preferably done when transferring the polymer from one polymerisation stage to another.

The catalyst may be transferred into the first reactor by any means known in the art. For example, it is possible to suspend the catalyst in a diluent and maintain it as a slurry, to mix the catalyst with a viscous mixture of grease and oil and feed the resultant paste into the polymerisation zone or to let the catalyst settle and introduce portions of thus obtained catalyst mud into the polymerisation.

Where the higher molecular weight component is made second in a multi-stage polymerisation it is not possible to measure its properties directly. However, the skilled man is able to determine the density, MFR2, etc. of the higher molecular weight component using Hagström equation (Hagström, The Polymer Processing Society, Europe/Africa Region Meeting, Gothenburg, Sweden, Aug. 19-21, 1997):

$$MI_b = \left(w \cdot MI_1^{-\frac{w^{-b}}{a}} + (1-w) \cdot MI_2^{-\frac{w^{-b}}{a}}\right)^{-a \cdot w^b} \quad \text{(eq. 3)}$$

According to said Hagström, in said equation (eq. 3), a=5.2 and b=0.7 for MFR2. Furthermore, w is the weight fraction of the other ethylene polymer component, e.g. component (A), having higher MFR. The LMW component can thus be taken as the component 1 and the HMW component as the component 2. MIb is the MFR2 of the final polyethylene.

The process may also involve a prepolymerization step. This prepolymerization step is a conventional step used routinely in polymer synthesis.

The prepolymerization step may be conducted in slurry or in gas phase. Preferably prepolymerization is conducted in slurry, preferably in a loop reactor. The prepolymerization is then preferably conducted in an inert diluent, preferably the diluent is a low-boiling hydrocarbon having from 1 to 4 carbon atoms or a mixture of such hydrocarbons. The temperature in the prepolymerization step is typically from 0 to 90° C., preferably from 20 to 80° C. and more preferably from 25 to 70° C.

The pressure is not critical and is typically from 1 to 150 bar, preferably from 10 to 100 bar.

The catalyst is preferably all introduced to the prepolymerization step. Preferably the reaction product of the prepolymerization step is then introduced to the first reactor.

If present, the prepolymer component is deemed a part of the LMW component.

Generally, the quantity of catalyst used will depend upon the nature of the catalyst, the reactor types and conditions and the properties desired for the polymer product. As is well known in the art hydrogen can be used for controlling the molecular weight of the polymer in any reactor.

Polymer made in the process of the invention can be used in a variety of applications such as films, e.g. blown or cast films. They also have utility in moulding applications.

The catalyst system prepared according to the invention especially possesses excellent catalyst activity throughout the multi-stage polymerisation process and at the same time is able to provide polymers of high weight average molecular weight $M_w$ and high comonomer content.

The invention will now be defined with reference to the following non-limiting examples and figures.

FIG. 1 shows catalyst activity for IC1, IC2, CC1, CC2, CC3 and CC4 in ethylene slurry copolymerisation (examples IE1-1, IE2-1, CE1-1, CE2-1, CE3-1 and CE4-1).

Figure 2:
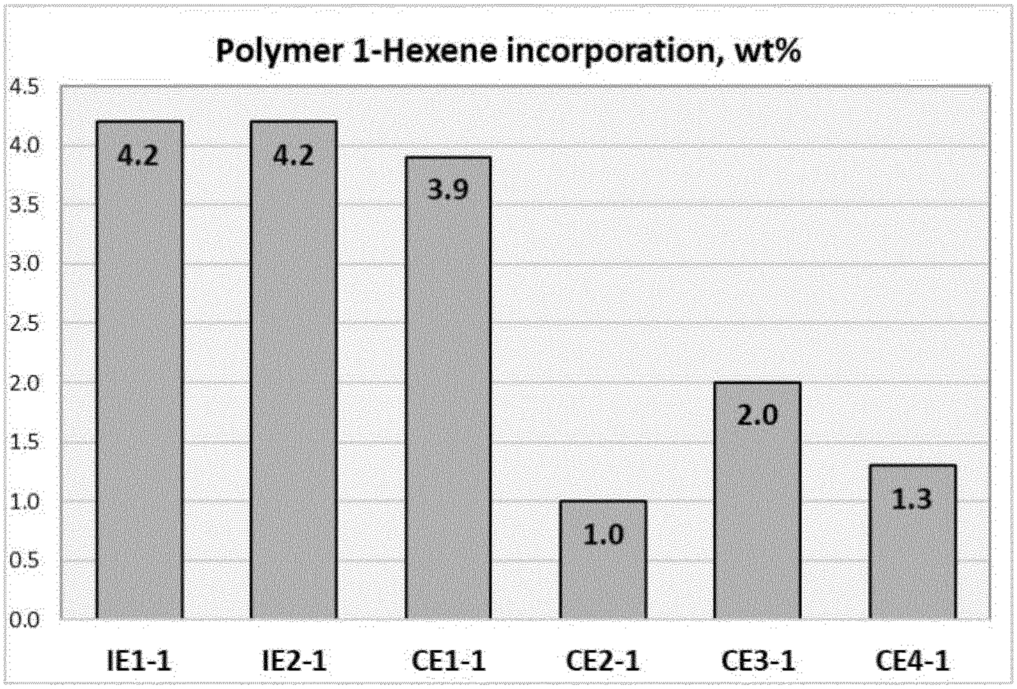
FIG. 2 shows 1-hexene incorporation for IC1, IC2, CC1, CC2, CC3 and CC4 in ethylene slurry copolymerisation (examples IE1-1, IE2-1, CE1-1, CE2-1, CE3-1 and CE4-1).

FIG. 2 shows 1-hexene incorporation for IC1, IC2, CC1, CC2, CC3 and CC4 in ethylene slurry copolymerisation (examples IE1-1, IE2-1, CE1-1, CE2-1, CE3-1 and CE4-1).

Figure 3:
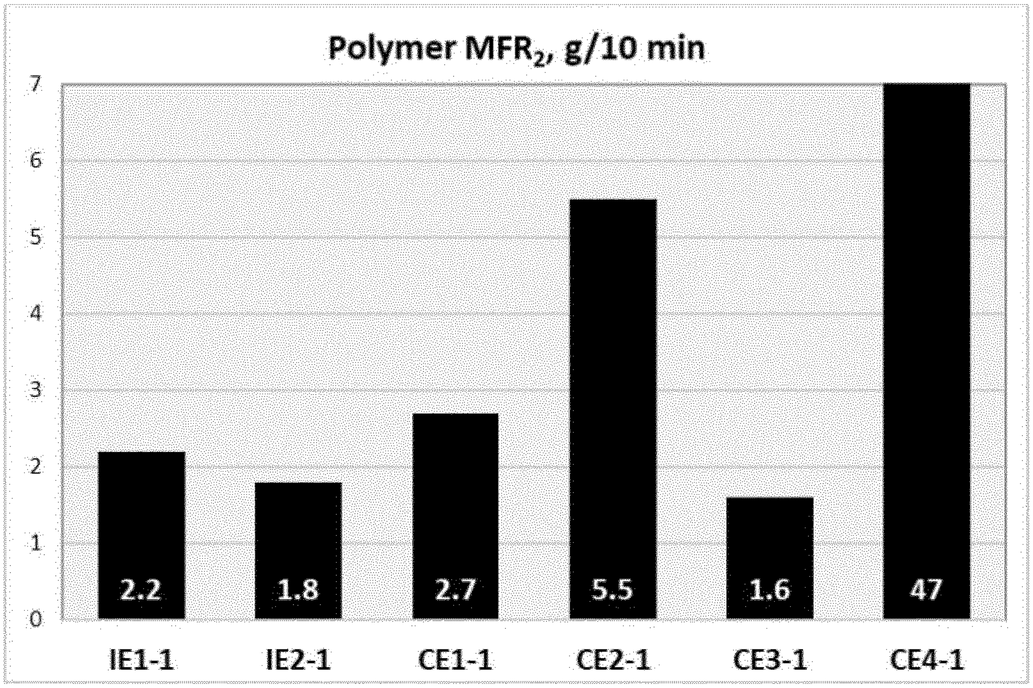
FIG. 3 shows polymer MFR2 for IC1, IC2, CC1, CC2, CC3 and CC4 in ethylene slurry copolymerisation (examples IE1-1, IE2-1, CE1-1, CE2-1, CE3-1 and CE4-1).

FIG. 3 shows polymer MFR2 for IC1, IC2, CC1, CC2, CC3 and CC4 in ethylene slurry copolymerisation (examples IE1-1, IE2-1, CE1-1, CE2-1, CE3-1 and CE4-1).

Figure 4:
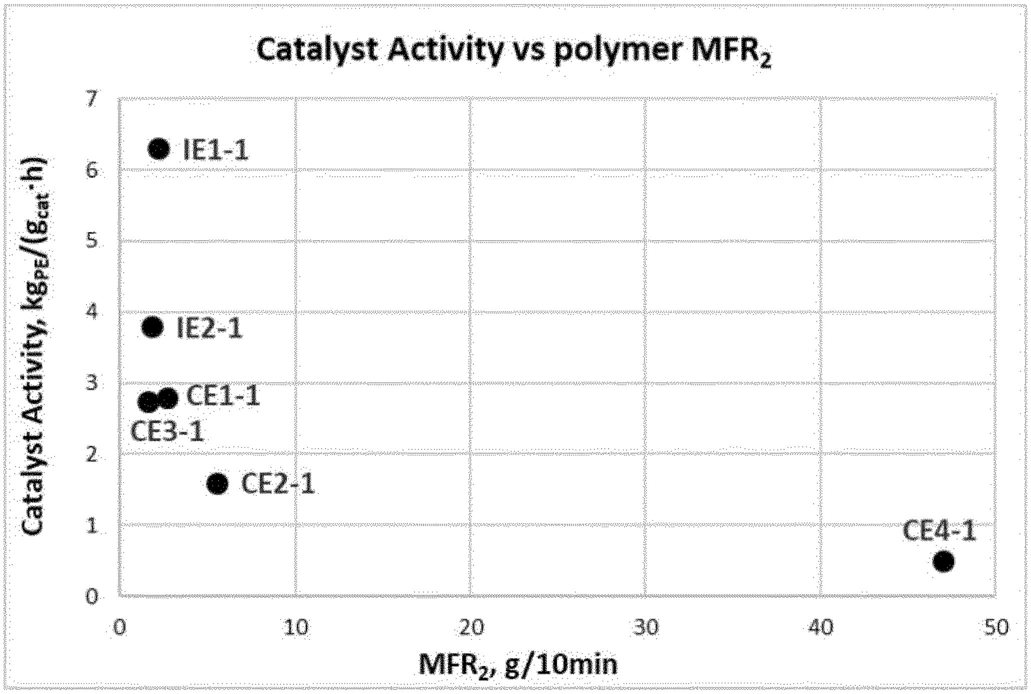
FIG. 4 shows catalyst activity versus polymer MFR2 for IC1, IC2, CC1, CC2, CC3 and CC4 in ethylene slurry copolymerisation (examples IE1-1, IE2-1, CE1-1, CE2-1, CE3-1 and CE4-1).

FIG. 4 shows catalyst activity versus polymer MFR2 for IC1, IC2, CC1, CC2, CC3 and CC4 in ethylene slurry copolymerisation (examples IE1-1, IE2-1, CE1-1, CE2-1, CE3-1 and CE4-1).

Figure 5:
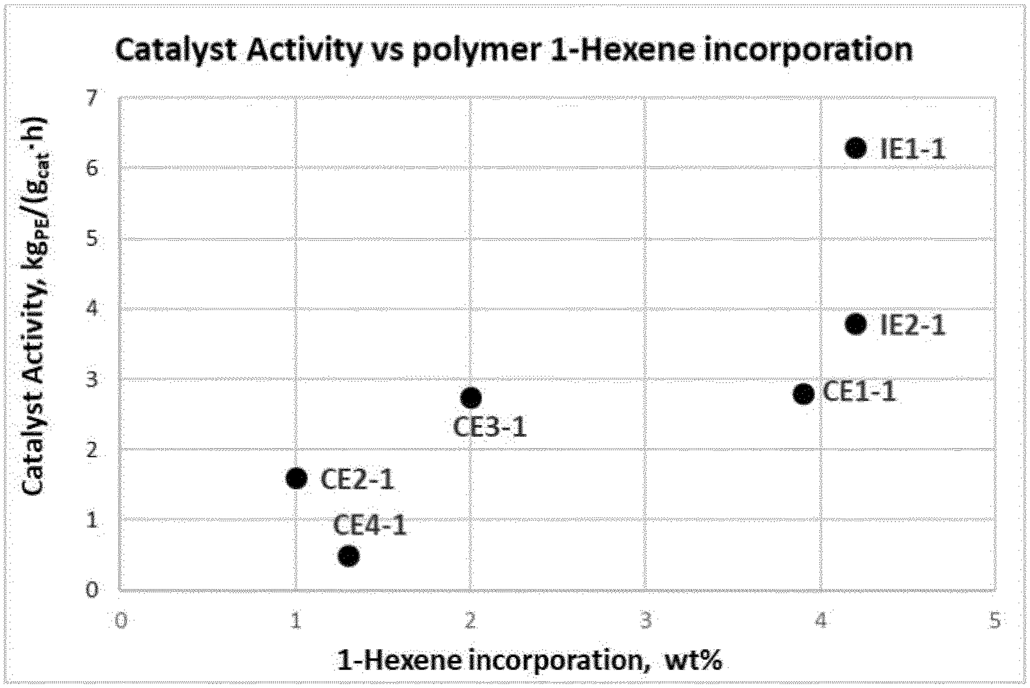
FIG. 5 shows catalyst activity versus polymer 1-hexene content for IC1, IC2, CC1, CC2, CC3 and CC4 in ethylene slurry copolymerisation (examples IE1-1, IE2-1, CE1-1, CE2-1, CE3-1 and CE4-1).

FIG. 5 shows catalyst activity versus polymer 1-hexene content for IC1, IC2, CC1, CC2, CC3 and CC4 in ethylene slurry copolymerisation (examples IE1-1, IE2-1, CE1-1, CE2-1, CE3-1 and CE4-1).

Figure 6:
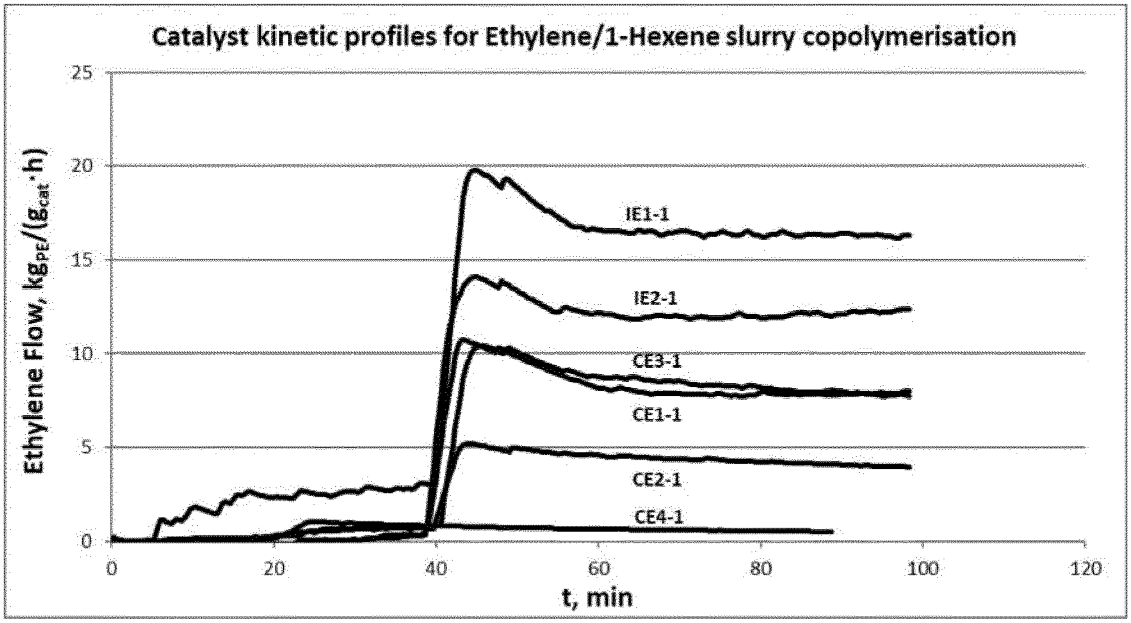
FIG. 6 shows catalyst kinetic profiles (ethylene) for IC1, IC2, CC1, CC2, CC3 and CC4 in ethylene slurry copolymerisation (examples IE1-1, IE2-1, CE1-1, CE2-1, CE3-1 and CE4-1).

FIG. 6 shows catalyst kinetic profiles (ethylene) for IC1, IC2, CC1, CC2, CC3 and CC4 in ethylene slurry copolymerisation (examples IE1-1, IE2-1, CE1-1, CE2-1, CE3-1 and CE4-1).

Figure 7:
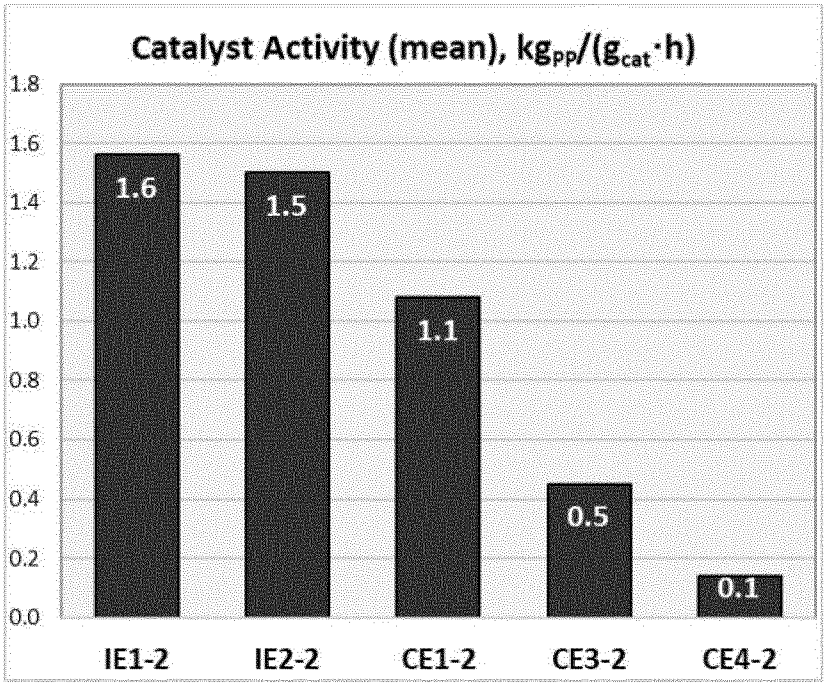
FIG. 7 shows catalyst activity for IC1, IC2, CC1, CC3 and CC4 in propylene bulk homopolymerization (examples IE1-2, IE2-2, CE1-2, CE3-2 and CE4-2).

FIG. 7 shows catalyst activity for IC1, IC2, CC1, CC3 and CC4 in propylene bulk homopolymerization (examples IE1-2, IE2-2, CE1-2, CE3-2 and CE4-2).

Figure 8:
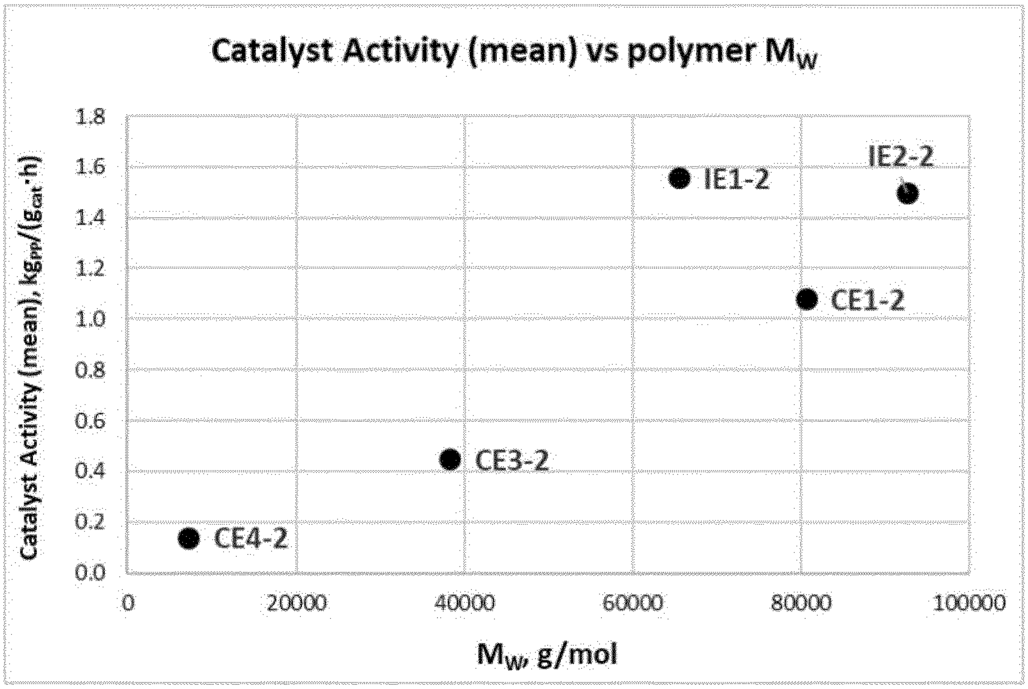
FIG. 8 shows catalyst activity versus polymer $M_w$ for IC1, IC2, CC1, CC3 and CC4 in propylene bulk homopolymerization (examples IE1-2, IE2-2, CE1-2, CE3-2 and CE4-2).

FIG. 8 shows catalyst activity versus polymer $M_w$ for IC1, IC2, CC1, CC3 and CC4 in propylene bulk homopolymerization (examples IE1-2, IE2-2, CE1-2, CE3-2 and CE4-2).

Figure 9:
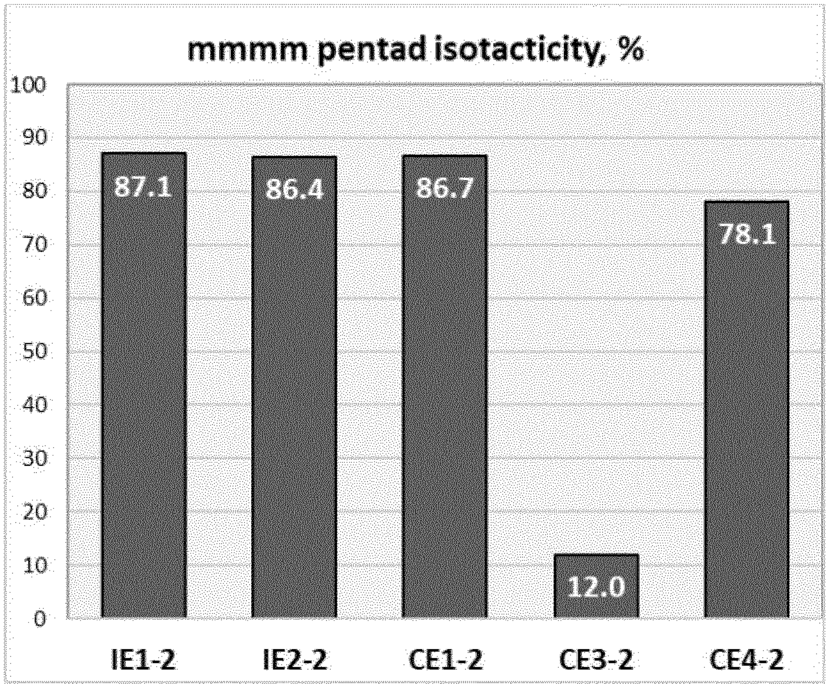
FIG. 9 shows polymer mmmm pentad isotacticity for IC1, IC2, CC1, CC3 and CC4 in propylene bulk homopolymerization (examples IE1-2, IE2-2, CE1-2, CE3-2 and CE4-2).

FIG. 9 shows polymer mmmm pentad isotacticity for IC1, IC2, CC1, CC3 and CC4 in propylene bulk homopolymerization (examples IE1-2, IE2-2, CE1-2, CE3-2 and CE4-2).

Figure 10:
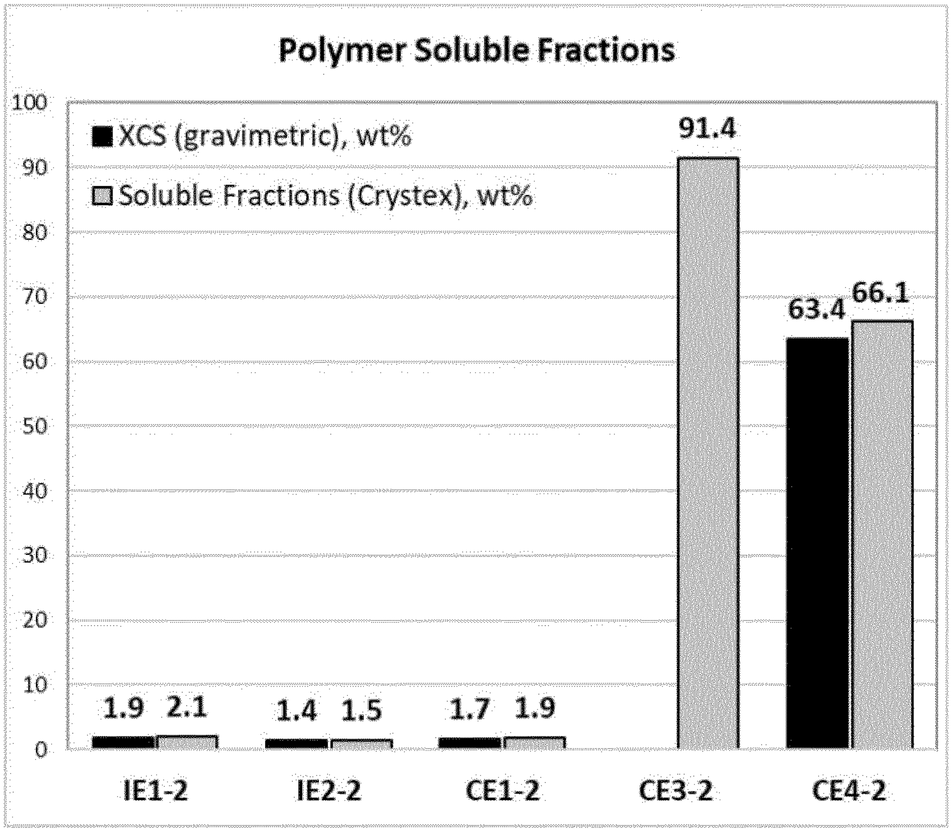
FIG. 10 shows polymer soluble fractions for IC1, IC2, CC1, CC3 and CC4 in propylene bulk homopolymerization (examples IE1-2, IE2-2, CE1-2, CE3-2 and CE4-2).

FIG. 10 shows polymer soluble fractions for IC1, IC2, CC1, CC3 and CC4 in propylene bulk homopolymerization (examples IE1-2, IE2-2, CE1-2, CE3-2 and CE4-2).

EXPERIMENTAL

Analytical Methods

Catalyst Analytics and Characterisation

Al and Zr Content in Solid Catalyst by ICP-OES

In a glovebox, an aliquot of the catalyst (ca. 40 mg) is weighted into a glass weighing boat using an analytical balance. The sample is then allowed to be exposed to air overnight while being placed in a steel secondary container equipped with an air intake. Then, 5 mL of concentrated (65%) Nitric acid is used to rinse the content of the boat into an Xpress microwave oven vessel (20 mL). A sample is then subjected to microwave-assisted acid digestion using MARS 6 laboratory microwave unit with ramping to 150° C. within 20 minutes and a hold phase at 150° C. for 35 minutes. The digested sample is allowed to cool down to room temperature and then transferred into a plastic 100 mL volumetric flask. Standard solutions containing 1000 mg/L Yttrium (0.4 mL) are added. The flask is then filled up with distilled water and shaken. The solution is filtered through 0.45 μm Nylon syringe filters and subjected to analysis using Thermo iCAP 6300 ICP-OES and iTEVA software.

The instrument is calibrated for Al and Zr using a blank (a solution of 5% $HNO_3$, prepared from concentrated Nitric acid) and six standards of 0.005 mg/L, 0.01 mg/L, 0.1 mg/L, 1 mg/L, 10 mg/L and 100 mg/L of Al and Zr in solutions. The solutions contain 5% $HNO_3$ (from concentrated nitric acid), 4 mg/L of Y standard in distilled water. Plastic volumetric flasks are used. Curvilinear fitting and 1/concentration weighting are used for the calibration curves. Immediately before analysis, the calibration is verified and adjusted (instrument re-slope function) using the blank and the 10 mg/L Al and Zr standard which has 4 mg/L Y and 5% $HNO_3$, from concentrated nitric acid, in distilled water. A quality control sample (QC: 1 mg/L Al; 2 mg/L Zr and 4 mg/L Y in a solution of 5% $HNO_3$, from concentrated nitric acid, in distilled water) is run to confirm the re-slope. The QC sample is also run at the end of a scheduled analysis set.

The content for Zr is monitored using the 339.198 nm line. The content of Al is monitored via the 394.401 nm line. The Y 371.030 nm is used as the internal standard. The reported values are calculated back to the original catalyst sample using the original mass of the catalyst aliquot and the dilution volume.

Volatiles Content in a Solid Catalyst by GC-MS

A test portion of 50-80 mg of catalyst powder is weighed accurately into a 20 mL headspace vial under inert atmosphere. The vial is capped using an aluminium cap with PTFE/silicone septum. 1 mL of internal standard solution (50 mg Toluene-$d_8$ and 50 mg n-Nonane in 100 mL n-Dodecane) is added into the sample vial through the septum cap using a precision micro-syringe. The same ISTD solution is used for the samples and for the calibration standard solutions.

For the calibration, a standard stock solution is prepared by weighing accurately 40 mg of each analyte component (n-Pentane, n-Heptane and Toluene) into a 20 mL volumetric flask which is filled up to the mark with ISTD stock solution. Calibration solutions with different analyte concentrations are prepared by dosing six increasing portions (0.1-1 mL) of analyte standard stock solution accurately into 20 mL headspace vials followed by addition of ISTD solution in decreasing volumes, bringing the total ISTD stock solution volume to 1.0 mL in each vial. The analyte amount in the final calibration samples ranges from 0.2 mg/mL to 2 mg/mL. For a blank 1 mL of ISTD stock solution is transferred into a 20 mL headspace vial.

The measurement is performed using an Agilent 7890B Gas Chromatograph equipped with an Agilent 7697A headspace sampler and an Agilent 5977A Mass Spectrometer Detector. The carrier gas is 99.9996% Helium. The headspace sampler oven temperature is set to 80° C. with loop and transfer line temperatures at 120° C. The vial equilibration time is 15 minutes. For sampling, the headspace sample vial is filled in the flow to pressure mode and pressurised with a flow of 20 mL/min to 172 kPa. The sampling of the loop is ramped at 138 kPa/min with final pressure of 34 kPa. The carrier gas flow in the DB-ProSteel transfer line with 0.53 mm diameter is 54 mL/min.

The gas chromatography inlet is operating in split mode. The inlet temperature is set to 280° C. and pressure to 18.236 psi, total flow is 111.9 mL/min, septum purge flow 3 mL/min and split flow 108 mL/min. The split ratio is 120:1. The inlet liner uses ultra-inert split liner with glass wool.

The separation is achieved using a ZB-XLB-HT Inferno 60 m×250 μm×0.25 μm column (Phenomenex) with a pre-column restriction capillary of 3 m×250 μm×0 μm. The carrier flow in the analytical column is 1.1 mL/min. The initial oven temperature is 40° C. and the hold time is 0.1 minutes. The oven ramp consists of a first stage of 5° C./min to 60° C. and a second stage of 10° C./min to 120° C. and a third stage of 40° C./min to 250° C.

The MS detector transfer line is kept at 300° C. The MSD is operated in Electron Impact mode at 70 eV and scan mode ranging from 33-175 m/z, step size 0.1 m/z. The source temperature is 230° C. and the quadrupole temperature is set to 150° C. Threshold is set to 50 counts and electron multiplier gain factor to 1. The detector is switched off after 11.40 minutes.

The signal identities are determined by retention times (Pentane 4.5, Heptane 6.3, Toluene 7.8, Toluene-$d_8$ 7.7 and n-Nonane 10.0) and target ion m/z (Pentane 55.0, Heptane 100.0, Toluene 91.0, Toluene-$d_8$ 98.0 and n-Nonane 98.0). Additionally qualifier ions are used for confirmation of the identification (Heptane, Toluene). The target ion signals of each analyte and the internal standard are integrated and compared to calibration curve, established in the beginning of each run with the six calibration samples. The calibration curves for the response ratios are linear; sample concentration weighting is applied for pentane. A quality control sample is used in each run to verify the standardisation. The mass of the test portion is used for calculating the analyte concentration in the sample for both replicates and the result reported as the average.

Polymer Analytics and Characterisation

Polymer Melt Flow Rate (MFR)

The melt flow rate (MFR) is determined according to ISO 1133 and is indicated in g/10 min. The MFR is an indication of the melt viscosity of the polymer. MFR is determined at 190° C. for PE and 230° C. for PP. The load under which the melt flow rate is determined is usually indicated as a subscript, for instance, MFR2 is measured under 2.16 kg load and MFR21 is measured under 21.6 kg load. $FRR_{21:2}$ is the ratio of MFR21 to MFR2.

Polymer Comonomer Content (1-Hexene) by FTIR

Comonomer content is determined based on Fourier Transform Infrared Spectroscopy (FTIR) using Bruker Tensor 37 spectrometer together with OPUS software. Approximately 0.3 grams of sample is compression-moulded into circular films with thickness of 300 μm and diameter of 28 mm. Silicone paper liner is used on both sides of the film. The films are not touched by bare hands to avoid contamination. The films are pressed by using Fontijne Press model LabEcon 300. The moulding is carried out according to the following program:

4 min pre-heating
3 min 11 kN
1 min 120 kN

The cooling is performed according to the following program with the set point at 15° C.:

3 min 50 kN

Hexene comonomer content is determined from the absorbance at the wave number of approximately 1378 cm-1 and the reference peak is 2019 cm-1. The analysis is performed using a resolution of 2 cm-1, wave number span from 4000 to 400 cm-1 and for the duration of 16 scans. At least two spectra are obtained from each film.

The reference peak is 2100-1980 cm-1 and integration method G of the OPUS software is used ($A_R$ value). The baseline for comonomer area is defined between the two points: 1400 $cm^{-1}$ and 1330 $cm^{-1}$. The baseline is determined using the following method: within the set wavenumber range, the highest peak is located and then the minima to the left and to the right of this highest peak. The baseline connects these minima. Method L of the Opus software is used for calculation of comonomer peak Intensity relative to its baseline ($A_Q$ value).

Hexene content is calculated automatically by OPUS software using the NMR/FTIR calibration curve. The comonomer content in the calibration sample materials used in construction of the calibration curve is pre-determined by NMR-spectrometry.

The calibration curve is represented by the following equation:

$$W_{NMR} = -1.705 + 46.839 \cdot A_0$$

where $A_0$ is the FTIR absorbance value of the comonomer highest peak (relative to baseline, $A_Q$) divided by the area of the reference peak ($A_R$), provided by OPUS software.

The comonomer content is determined from both of the obtained spectra and the value is calculated as the average of these results in wt %.

Polymer Bulk Density

Bulk Density (Apparent Density) is measured for PE examples according to the Method A of ASTM D1895 using a described therein apparatus with a 100 $cm^3$ measuring cup and for PP examples using 20 or 30 $cm^3$ measuring cup according to EN ISO 60.

Polymer Melting and Crystallisation Properties by DSC

Polymer Differential Scanning calorimetry (DSC) analysis is performed on a TA Instruments Q200 device calibrated with Indium, Zinc, and Tin according to ISO 11357/1 under Nitrogen atmosphere on 5±1 mg samples. The polymer powder or MFR-string cut sample is placed in an aluminium pan, weighed to the nearest 0.01 mg and the pan is sealed with a lid. DSC is run in a heat/cool/heat cycle with a scan rate of 10° C./min between −30° C. and 225° C. according to ISO 11357/3 for the first heating run, cooling run and second heating run. The first melting run is used to remove the thermal history of the sample.

Crystallisation temperature ($T_c$) is determined from the cooling run, while main melting temperature ($T_m$), degree of crystallinity (Cryst. %) and heat of melting ($H_m$) are determined from the second heating run.

Polymer Molecular Weights and Molecular Weight Distribution by GPC

Molecular weight averages ($M_z$, $M_w$ and $M_n$), Molecular weight distribution (MWD) and its broadness, described by polydispersity index, PDI=$M_w$/$M_n$ (wherein $M_n$ is the number average molecular weight and $M_w$ is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i \times M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain), equipped with 3× Agilent-PLgel Olexis and 1× Agilent-PLgel Olexis Guard columns was used. As the solvent and mobile phase 1,2,4-trichlorobenzene (TCB) stabilised with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS} = 19 \times 10^{-3} \text{ mL/g}, \alpha_{PS} = 0.655$$

$$K_{PE} = 39 \times 10^{3} \text{ mL/g}, \alpha_{PE} = 0.725$$

$$K_{PP} = 19 \times 10^{-3} \text{ mL/g}, \alpha_{PP} = 0.725$$

A third order polynomial fit was used to fit the calibration data.

All samples were prepared in the concentration range of 0.5-1 mg/mL and dissolved at 160° C. for 2.5 hours for PP or 3 hours for PE under continuous gentle shaking.

Polymer Xylene Solubles (Gravimetric)

Determination of the Quantity of Xylene soluble matter in Polypropylene is achieved according to the ISO16152.

A weighed amount of a sample is dissolved in hot xylene under reflux conditions at 135° C. The solution is then cooled down under controlled conditions and maintained at 25° C. for 30 minutes to ensure controlled crystallisation of the insoluble fraction. This insoluble fraction is then separated by filtration. Xylene is evaporated from the filtrate leaving the soluble fraction as a residue. The percentage of this fraction is determined gravimetrically.

$$\% XS = \frac{m_1 \times v_0}{m_0 \times v_1} \times 100$$

where

- $m_0$ is the mass of the sample test portion weighed, in grams
- $m_1$ is the mass of residue, in grams
- $v_0$ is the original volume of solvent taken
- $v_1$ is the volume of the aliquot taken for determination Polymer Soluble Fractions by Crystex The crystalline (CF) and soluble fractions (SF) of the polypropylene (PP) compositions as well as the comonomer content and intrinsic viscosities of the respective fractions were analysed by the CRYSTEX QC Polymer Char (Valencia, Spain).

A schematic representation of the CRYSTEX QC instrument is presented in Del Hierro, P.; Ortin, A.; Monrabal, B.; 'Soluble Fraction Analysis in polypropylene, The Column, February 2014. Pages 18-23. The crystalline and amorphous fractions are separated through temperature cycles of dissolution at 160° C., crystallisation at 40° C. and re-dissolution in 1,2,4-trichlorobenzene (1,2,4-TCB) at 160° C. Quantification of SF and CF and determination of ethylene content (C2) are achieved by means of an infrared detector (IR4) and an online 2-capillary viscometer is used for determination of the intrinsic viscosity (IV).

IR4 detector is multiple wavelength detector detecting IR absorbance at two different bands (CH3 and CH2) for the determination of the concentration determination and the Ethylene content in Ethylene-Propylene copolymers. IR4 detector is calibrated with series of EP copolymers with known Ethylene content in the range of 2 wt % to 69 wt % (determined by $^{13}$C-NMR).

Amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 wt %.

Intrinsic viscosity (IV) of the parent EP copolymer and its soluble and crystalline fractions are determined with a use of an online 2-capillary viscometer and are correlated to corresponding IV's determined in decalin according to ISO 1628.

Calibration is achieved with several commercial EP PP copolymers with IV=2-4 dL/g.

A sample of the PP composition to be analysed is weighed out in concentrations of 10 mg/mL to 20 mg/mL. After automated filling of the vial with 1,2,4-TCB containing 250 mg/L 2,6-tert-butyl-4-methylphenol (BHT) as antioxidant, the sample is dissolved at 160° C. until complete dissolution is achieved, usually for 60 min, with constant stirring of 800 rpm.

A defined volume of the sample solution is injected into the column filled with inert support where the crystallisation of the sample and separation of the soluble fraction from the crystalline part is taking place. This process is repeated two times. During the first injection the whole sample is measured at high temperature, determining the IV [dL/g] and the C2 [wt %] of the PP composition. During the second injection the soluble fraction (at low temperature) and the crystalline fraction (at high temperature) with the crystallisation cycle are determined (wt % SF, wt % C2, IV).

Quantification of Microstructure by NMR Spectroscopy

Quantitative nuclear-magnetic resonance (NMR) spectroscopy was used to quantify the isotacticity of the polymers.

Quantitative $^{13}C\{^1H\}$ NMR spectra recorded in the solution-state using a Bruker Avance Neo 400 MHz NMR spectrometer operating at 400.15 and 100.63 MHz for $^1$H and $^{13}$C respectively. All spectra were recorded using a $^{13}$C optimised 10 mm selective excitation probehead at 125° C. using nitrogen gas for all pneumatics. Approximately 200 mg of material was dissolved in 1,1,2,2-tetrachloroethane-$d_2$ (TCE-$d_2$) using approximately 3 mg of 2,6-di-tert-butyl-4-methylphenol (CAS 128-37-0) as stabiliser. Standard 90 degree single-pulse excitation was employed utilising the NOE, bi-level WALTZ16 decoupling scheme, relaxation delay of 3 s and 10 Hz sample rotation {zhou07, busico07}. A total of 6144 (6k) transients were acquired per spectra. This setup was chosen primarily for the high resolution needed for tacticity distribution quantification {busico01, busico97}.

$^{13}C\{^1H\}$ NMR spectra were processed, integrated and relevant quantitative properties determined from the integrals using proprietary computer programs. All chemical shifts were internally referenced to the methyl signal of the isotactic pentad mmmm at 21.85 ppm. The tacticity distribution was quantified through integration of the methyl region between 23.6 and 19.7 ppm correcting for any sites not related to the stereo sequences of interest {busico01, busico97}.

The pentad tacticity distribution was determined through direct separate integration of each methyl signal from a given steric pentad followed by normalisation to the sum of methyl signals from all steric pentads. The relative content of a specific steric pentad was reported as the mole fraction or percentage of a given steric pentad xxxx with respect to all steric pentads: [xxxx]=xxxx/(mmmm+mmmr+rmmr+mmrr+xmrx+mrmr+rrrr+mrrr+mrrm) where xmrx represents the combined integral of both mmrm and rmrr as signal from these steric pentads are not commonly resolved. The pentad isotacticity was thus given by: [mmmm]=mmmm/(mmmm+mmmr+rmmr+mmrr+xmrx+mrmr+rrrr+mrrr+mrrm)

The triad tacticity distribution was indirectly determined from the pentad tacticity distribution using the known pentad-triad necessary relationships:

$$[mm] = [mmmm] + [mmmr] + [rmmr]$$

$$[mr] = [mmrr] + [xmrx] + [mrmr]$$

$$[rr] = [rrrr] + [mrrr] + [mrrm]$$

busico01
Busico, V., Cipullo, R., Prog. Polym. Sci. 26 (2001) 443
busico97
Busico, V., Cipullo, R., Monaco, G., Vacatello, M., Segre, A. L., Macromolecules 30 (1997) 6251
zhou07
Zhou, Z., Kuemmerle, R., Qiu, X., Redwine, D., Cong, R., Taha, A., Baugh, D. Winniford, B., J. Mag. Reson. 187 (2007) 225 busico07

Busico, V., Carbonniere, P., Cipullo, R., Pellecchia, R., Severn, J., Talarico, G., Macromol. Rapid Commun. 2007, 28, 1128

Raw Materials

Pre-treated silica is a commercial synthetic amorphous silica ES757 obtained from PQ Corp. The pre-treatment refers to silica commercial calcination at 600° C. according to a conventional PO catalyst technique.

Methylaluminoxane (30 wt % MAO solution in Toluene, Axion CA 1330) was obtained from Lanxess.

Comparative metallocene complex MC3 is Rac-dimethylsilanediylbis[2-(5-trimethylsilylfuran-2-yl)-4,5-dimethylcyclopentadien-1-yl]zirconium dichloride. This complex was prepared in pure stereoisomeric form according to published synthetic procedure (U.S. Pat. No. 6,326,493). Its structure is:

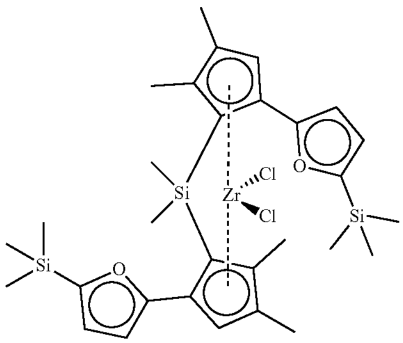

(MC3, comparative)

Comparative metallocene complex MC4 is unbridged Bis(1-methyl-3-n-butylcyclopentadienyl) zirconium dichloride which was obtained as a Toluene solution from a commercial source.

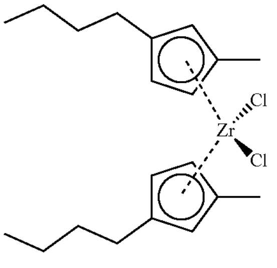

(MC4, comparative)

The Following Metallocenes are Prepared:

Inventive Metallocene Complex MC1 (Rac or Anti) and Comparative Metallocene MC5 (Meso or Syn)

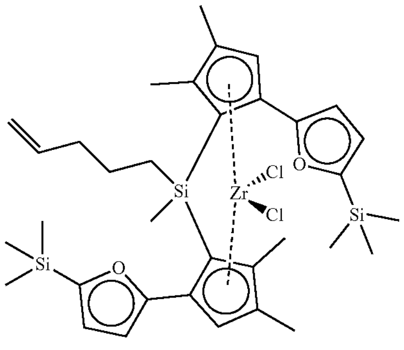

(MC1, anti- or rac-form, inventive)

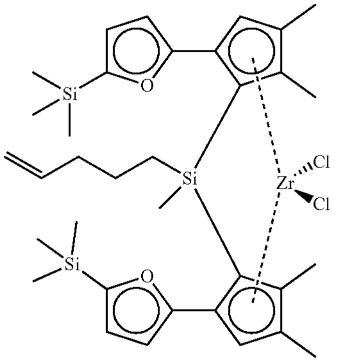

(MC5, syn- or meso-form, comparative)

Multi-Step Preparation:

Anti- and syn-methyl(pent-4-en-1-yl)silanediyl-bis[$\eta^5$-2-(2-(5-trimethylsilyl)furyl)-4,5-dimethylcyclopentadienyl]zirconium dichloride Bis[2-(2-(5-trimethylsilyl)furyl)-4,5-dimethylcyclopenta-2,4-dien-1-yl](methyl)pent-4-en-1-ylsilane

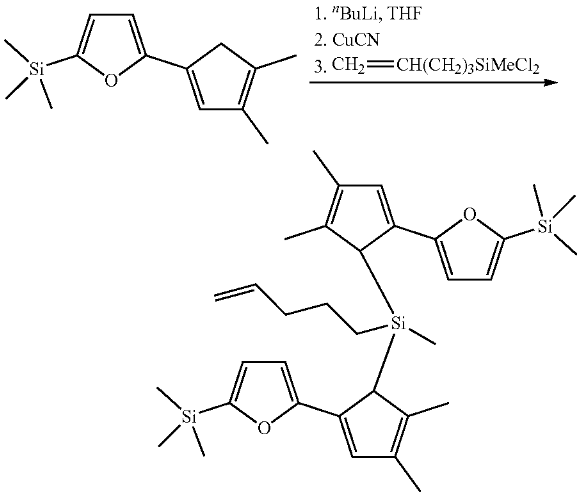

To a cooled to −78° C. solution of 19.6 g (84.3 mmol) of 1-(2-(5-trimethylsilyl)furyl)-3,4-dimethylcyclopenta-1,3-diene in 200 ml of THF 34.7 ml (84.3 mmol) of 2.43 M $^n$BuLi in hexanes was added. The resulting red solution was stirred for 4 h at room temperature, then cooled to −50° C., and 300 mg of CuCN was added. The obtained mixture was stirred for 15 min at −25° C., then 7.72 g (42.2 mmol) of dichloro(methyl)pent-4-en-1-ylsilane was added in one portion. This mixture was stirred overnight at room temperature. The solvents were removed on rotary evaporator; to the dark-red residue 600 ml of dichloromethane was added, and the resulting mixture was washed with 600 ml of water. The organic layer was separated, dried over $Na_2SO_4$, filtered through a pad of silica gel 60 (40-63 um), which was additionally washed by 2×50 ml of dichloromethane. The combined filtrate was evaporated under reduced pressure and dried in vacuum to give 21.9 g (90%, purity ca. 75%) of the target product (a ca. 60:40 mixture of two stereoisomers) as a dark-red oil.

Anti- and syn-methyl(pent-4-en-1-yl)silanediyl-bis[η$^5$-2-(2-(5-trimethylsilyl)furyl)-4,5-dimethylcyclopentadienyl]zirconium dichloride

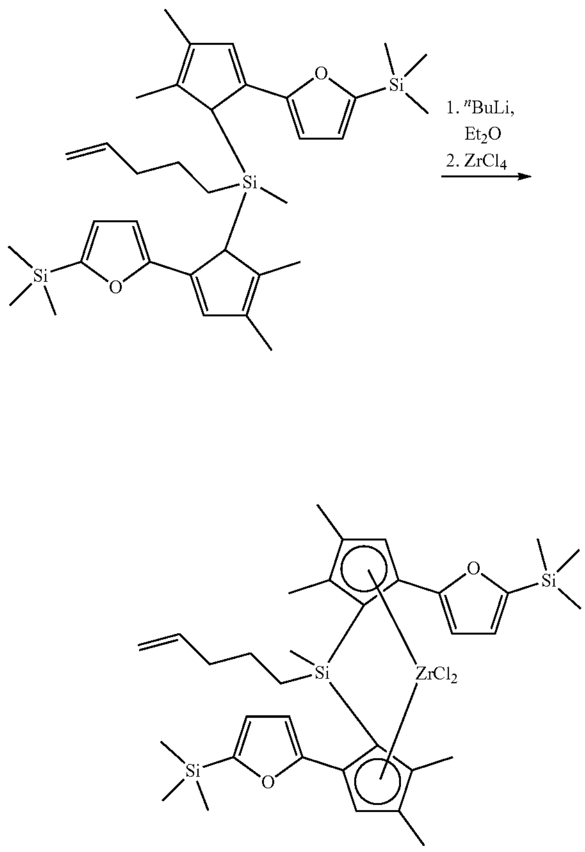

To a cooled to −78° C. solution of 21.85 g (ca. 28.5 mmol) of bis[2-(2-(5-trimethylsilyl)furyl)-4,5-dimethylcyclopenta-2,4-dien-1-yl](methyl)pent-4-en-1-ylsilane in 250 ml of ether 31.3 ml (76.1 mmol) of 2.43 M $^n$BuLi in hexanes was added. This mixture was stirred for 4 h at room temperature, then the resulting red solution was cooled to −78° C., and 8.86 g (38.02 mmol) of $ZrCl_4$ was added. The mixture was stirred for 20 h at room temperature (giving dark-red solution with yellow precipitate) which was then evaporated to dryness. The residue was stirred with 100 ml of hot toluene, and the formed suspension was filtered through a glass frit (G4). On the evidence of NMR spectroscopy, the filtrate included a mixture of the isomeric complexes, i.e. anti-complex and two isomeric syn-zirconocenes in a ca. 2:1:1 ratio. This filtrate was evaporated to dryness, the residue was dissolved in a mixture of 25 ml of n-hexane and 100 ml of n-pentane. Yellow solid precipitated from this solution overnight at −30° C. was filtered off (G4) and dried in vacuum. This procedure gave 3.90 g of anti-complex contaminated with syn-admixture. Recrystallisation of this sample from a mixture of 10 ml of toluene and 30 ml of n-hexane gave 3.00 g of pure anti-zirconocene dichloride. The mother liquor (obtained after isolation 3.90 g sample) was evaporated to dryness, and the residue was dissolved in 100 ml of n-pentane. Yellow solid precipitated from the obtained solution overnight at −30° C. was filtered off (G4) and dried in vacuum to give 1.85 g of anti-isomer containing trace amount of one of the two syn-complexes. Finally, the mother liquor was evaporated to dryness to the state of dark foam, and this foam was then dissolved in 150 ml of n-pentane. Yellow precipitate fallen from this solution for 2 days at −30° C. was filtered off (G4), washed with 5 ml of toluene and dried in vacuum to give 2.10 g of a 45:55 mixture of anti- and syn-complexes. Recrystallisation of this mixture from a mixture of n-hexane and n-pentane gave 0.23 g of one of the two syn-complexes contaminated with ca. 6% of anti-isomer. Thus, the total yield of anti- and syn-complexes was 7.85 g (37.5%). It should be noted that only one of the two syn-isomers was isolated in this reaction.

Anti-methyl(pent-4-en-1-yl)silanediyl-bis[η$^5$-2-(2-(5-trimethylsilyl)furyl)-4,5-dimethylcyclopentadienyl]zirconium dichloride Anal. calc. for $C_{34}H_{48}Cl_2O_2Si_3Zr$: C, 55.55; H, 6.58. Found: C, 55.81; H, 6.70.

$^1$H NMR ($CDCl_3$): δ 6.71 (2s, 2H), 6.61 (d, J=3.2 Hz, 2H), 6.56 (d, J=3.2 Hz, 1H), 6.52 (d, J=3.2 Hz, 1H), 5.90-5.77 (m, 1H), 5.04 (dm, J=17.1 Hz, 1H), 4.98 (dm, J=10.2 Hz, 1H), 2.28-2.10 (m, 2H), 2.19 (s, 6H), 1.85-1.59 (m, 2H), 1.48 (s, 3H), 1.46 (s, 3H), 1.21 (t, J=8.4 Hz, 2H), 0.73 (s, 3H), 0.29 (s, 9H), 0.28 (s, 9H). $^{13}$C {$^1$H} NMR ($CDCl_3$): δ 159.81, 159.56, 153.28, 153.20, 138.54, 138.31, 138.02, 129.57, 129.13, 128.51, 127.78, 123.06, 122.11, 121.82, 121.74, 114.96, 110.30, 110.17, 99.93, 99.75, 37.22, 22.79, 16.84, 14.47, 14.31, 14.25, 14.00, 0.42, −1.24, −1.39.

Syn-methyl(pent-4-en-1-yl)silanediyl-bis[η$^5$-2-(2-(5-trimethylsilyl)furyl)-4,5-dimethylcyclopentadienyl] zirconium dichloride Anal. calc. for $C_{34}H_{48}C_{12}O_2Si_3Zr$: C, 55.55; H, 6.58. Found: C, 55.69; H, 6.76.

$^1$H NMR ($CDCl_3$): δ 6.63 (s, 2H), 6.31 (d, J=3.2 Hz, 2H), 6.11 (d, J=3.2 Hz, 2H), 5.93-5.80 (m, 1H), 5.09 (dm, J=17.1 Hz, 1H), 5.04 (dm, J=10.2 Hz, 1H), 2.31-2.23 (m, 2H), 2.28 (s, 6H), 2.00 (s, 6H), 1.85-1.73 (m, 2H), 1.53-1.45 (m, 2H), 0.40 (s, 3H), 0.22 (s, 18H). $^{13}$C {$^1$H} NMR ($CDCl_3$): δ 158.57, 152.38, 138.09, 138.06, 131.29, 129.02, 122.74, 121.42, 115.44, 110.23, 99.49, 37.28, 22.76, 16.54, 15.17, 14.32, 0.34, −1.40.

Inventive Metallocene Complex MC2

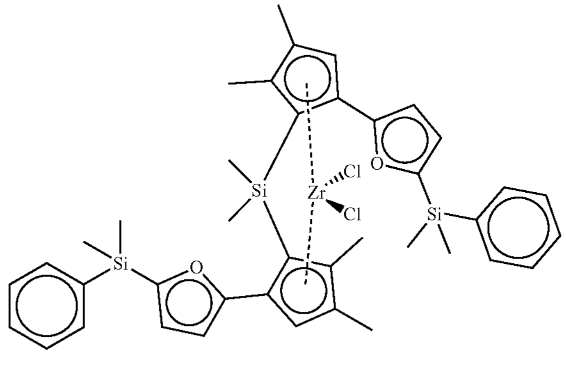

(MC2, rac-form, inventive)

Multi-Step Preparation:

Rac-dimethylsilanediyl-bis[$\eta^5$-2-(2-(5-dimethylphenylsilyl) furyl)-4,5-dimethylcyclopentadienyl]zirconium dichloride 2-Furyl(dimethyl)phenylsilane

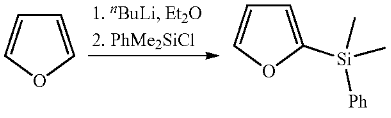

To a solution of 25.0 g (367 mmol) of furan in 165 ml of ether, cooled in an ice bath, 123.5 ml (300 mmol) of 2.43 M $^{n}$BuLi in hexanes was added dropwise over ca. 40 min. The resulting mixture was stirred for 3.5 h at room temperature, then the formed suspension was cooled to −78° C., and 50.0 ml (51.6 g, 302 mmol) of chloro(dimethyl)phenylsilane was added in one portion. The resulting mixture was stirred for 40 h at room temperature. The formed suspension was filtered through a pad of silica gel 60 (40-63 um), which was additionally washed with 3×50 ml of dichloromethane. The combined filtrate was evaporated under reduced pressure, and the residue was distilled in vacuum (b.p. 79° C./3-4 mm Hg) to give 56.6 g (93%) of 2-furyl(dimethyl)phenylsilane as a colourless liquid.

$^1$H NMR ($CDCl_3$): δ 7.67 (d, J=1.6 Hz, 1H), 7.58-7.53 (m, 2H), 7.38-7.33 (m, 3H), 6.67 (d, J=3.2 Hz, 1H), 6.38 (dd, J=3.2 Hz, J=1.6 Hz, 1H), 0.54 (s, 6H). $^{13}$C{$^1$H} NMR ($CDCl_3$): δ 158.14, 147.11, 136.95, 133.91, 129.37, 127.85, 121.02, 109.41, −2.91.

1-[2-(5-Dimethylphenylsilyl) furyl]-3,4-dimethylcyclopenta-1,3-diene

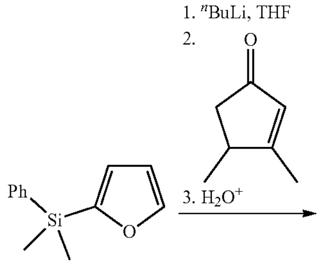

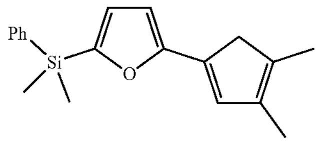

To a cooled to −78° C. solution of 20.2 g (100 mmol) of 2-furyl(dimethyl)phenylsilane in 150 ml of THF 41.2 ml (100.1 mmol) of 2.43 M $^{n}$BuLi in hexanes was added dropwise. The resulting mixture was stirred for 20 h at room temperature, then cooled to −30° C., and a solution of 11.0 g (100 mmol) of 3,4-dimethylcyclopent-2-en-1-one in 60 ml of THF was added dropwise by vigorous stirring. The resulting solution was stirred overnight at room temperature, then cooled in an ice bath, and 200 ml of 5 N HCl was added. This mixture was transferred into a separatory funnel, 600 ml of ether was added, and the obtained mixture was shaken for 1 min. The organic layer was separated, washed with 3×150 ml of water, dried over $Na_2SO_4$, and then evaporated to dryness. The residue was purified by flash column chromatography on silica gel 60 (40-63 um; eluent: hexane) to give 25.9 g (88%, purity ca. 90%) of the target product as a reddish oily liquid.

$^1$H NMR ($CDCl_3$): δ 7.59-7.56 (m, 2H), 7.38-7.33 (m, 3H), 6.62 (d, J=3.2 Hz, 1H), 6.57 (br.s, 1H), 6.21 (d, J=3.2 Hz, 1H), 3.21 (s, 2H), 1.94 (s, 3H), 1.87 (s, 3H), 0.54 (s, 6H). $^{13}$C {$^1$H} NMR ($CDCl_3$): δ 157.01, 156.14, 137.36, 135.34, 135.14, 133.97, 132.89, 131.37, 129.24, 127.80, 122.95, 104.15, 44.75, 13.35, 12.54, −2.75.

Bis[2-(2-(5-dimethylphenylsilyl) furyl)-4,5-dimethylcyclopenta-2,4-dien-1-yl]dimethylsilane

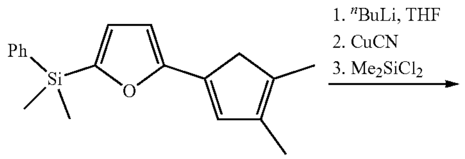

-continued

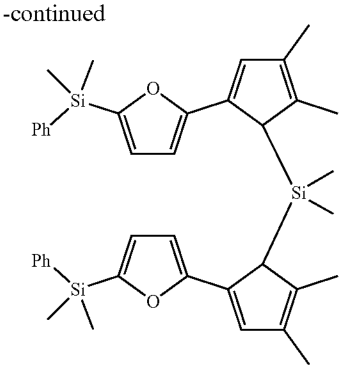

To a cooled to −78° C. solution of 25.9 g (87.9 mmol) of 1-[2-(5-dimethylphenylsilyl) furyl]-3,4-dimethylcyclopenta-1,3-diene in 200 ml of THF 36.2 ml (88.0 mmol) of 2.43 M $^n$BuLi in hexanes was added. The resulting dark-red solution was stirred for 3 h at room temperature, then cooled to −50° C., and 300 mg of CuCN was added. The obtained mixture was stirred for 15 min at −25° C., then 5.67 g (55.56 mmol) of dichlorodimethylsilane was added in one portion. This mixture was stirred overnight at room temperature. The solvents were removed on rotary evaporator, to the dark-red residue 700 ml of dichloromethane was added, and the resulting mixture was washed with 800 ml of water. The organic layer was separated, dried over $Na_2SO_4$, filtered through a pad of silica gel 60 (40-63 um), the latter was additionally washed with 2×50 ml of dichloromethane. The combined filtrate was evaporated under reduced pressure, and the residue was dried in vacuum to give 25.6 g (90%, purity ca. 80%) of the target pro-ligand (as a ca. 1:1 mixture of two stereoisomers) as a dark-red oil.

$^1$H NMR ($CDCl_3$): δ 7.57-7.46 (m, 4H), 7.39-7.26 (m, 6H), 6.59 (d, J=3.2 Hz), 6.57 (br.s) and 6.57 (d, J=3.2 Hz) {sum 4H}, 6.24 (d, J=3.2 Hz) and 6.07 (d, J=3.2 Hz) {sum 2H}, 4.07 (s) and 3.70 (s) {sum 2H}, 2.13 (s), 1.98 (s), 1.88 (s) and 1.87 (s) {sum 12H}, 0.51 (s), 0.50 (s), 0.48 (s) and 0.46 (s) {sum 12H}, −0.45 (s), −0.72 (s) and −0.78 (s) {sum 6H}.

Rac-dimethylsilanediyl-bis[η$^5$-2-(2-(5-dimethylphenylsilyl) furyl)-4,5-dimethylcyclopentadienyl]zirconium dichloride

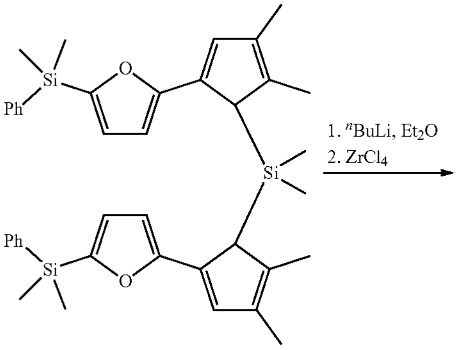

-continued

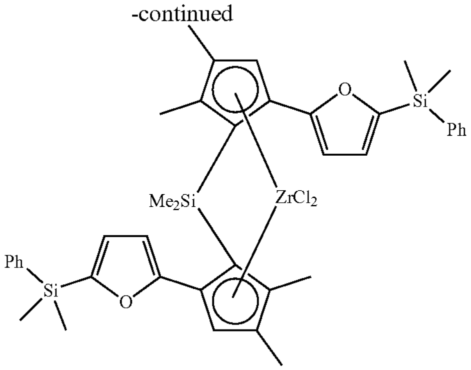

To a cooled to −78° C. solution of 25.6 g (ca. 39.7 mmol) of bis[2-(2-(5-dimethylphenylsilyl) furyl)-4,5-dimethylcyclopenta-2,4-dien-1-yl]dimethylsilane in 300 ml of ether 32.6 ml (79.2 mmol) of 2.43 M $^n$BuLi in hexanes was added. This mixture was stirred overnight at room temperature, then the resulting brown suspension with a lot of white precipitate was cooled to −78° C., and 9.25 g (39.7 mmol) of $ZrCl_4$ was added. The reaction mixture was stirred for 24 h at room temperature to give dark-red solution with yellow precipitate. The precipitate was filtered off. The filtrate was evaporated to ca. 30 ml, and then 30 ml of n-hexane was added. Yellow powder (a mixture of the target complex with LiCl) precipitated from this mixture was filtered off, washed with n-hexane, and then added to the above-isolated precipitate. Thus obtained solid was stirred with 50 ml of hot toluene (almost at reflux), and the formed suspension was filtered through a glass frit (G4). The filtrate was evaporated to ca. 25 ml, heated to ca. 60° C., and then 30 ml of n-hexane was added. Yellow powder precipitated from this solution overnight at room temperature was filtered off (G4), dried in vacuum to give 4.82 g of the target complex. The mother liquor was evaporated to ca. 5 ml, and 25 ml of hexane was added. Yellow solid precipitated from thus obtained mixture overnight at room temperature was collected (G4) and then dried in vacuum. This procedure gave extra 0.7 g of the title zirconocene. Thus, the total yield of the target rac-complex was 5.52 g (17%).

Anal. calc. for $C_{40}H_{46}C_{12}O_2Si_3Zr$: C, 59.67; H, 5.76. Found: C, 59.95; H, 5.81.

$^1$H NMR ($CDCl_3$): δ 7.58-7.52 (m, 2H), 7.41-7.31 (m, 3H), 6.69 (s, 1H), 6.65 (d, J=3.3 Hz, 1H), 6.55 (d, J=3.3 Hz, 1H), 2.16 (s, 3H), 1.35 (s, 3H), 0.56 (s, 3H), 0.55 (s, 3H), 0.54 (s, 3H). $^{13}C\{^1H\}$ NMR ($CDCl_3$): δ 157.60, 154.01, 138.23, 136.56, 134.06, 129.42, 128.77, 128.18, 127.80, 123.41, 122.01, 110.19, 100.06, 14.22, 14.18, 3.34, −2.65, −3.05.

Comparative Metallocene Complex MC6 and Metallocene MC7

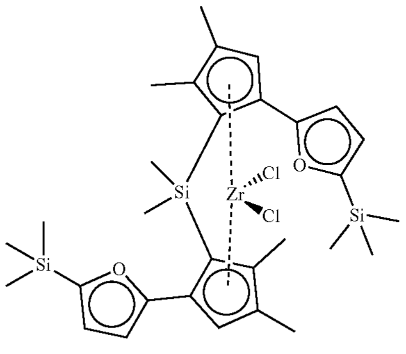

(MC6, rac-form, comparative)

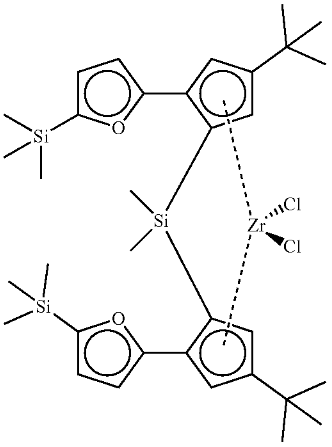

(MC7, meso-form, not used in examples)

Multi-Step Preparation:

Rac-dimethylsilanediyl-bis[$\eta^5$-2-(2-(5-trimethylsilyl)furyl)-4-tert-butylcyclopentadienyl]zirconium dichloride Ethyl 2-acetyl-5,5-dimethyl-4-oxohexanoate

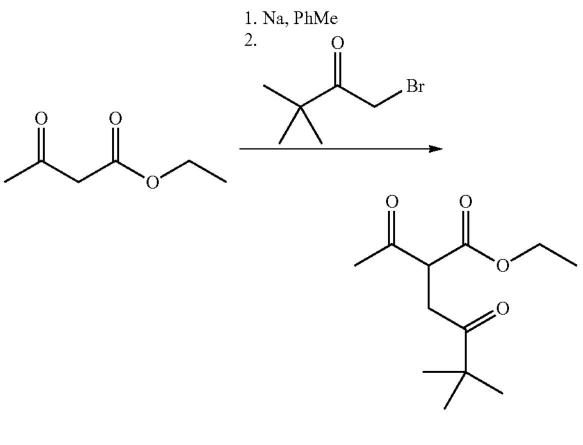

12.5 g (544 mmol, 1.66 equiv.) of sodium was added to 360 ml of toluene followed by 132 ml (1.04 mol, 3.16 equiv.) of ethyl acetoacetate. A vigorous exothermic reaction with evolution of molecular hydrogen took place after a minute and subsided after ca. 10 min. The reaction mixture was then stirred for 2 h at room temperature. To the resulting heterogeneous mixture 58.8 g (329 mmol) of 1-bromo-3,3-dimethylbutan-2-one was added dropwise, and the reaction mixture was stirred overnight at room temperature. The resulting mixture was cooled in an ice bath and then treated with 400 ml of water. Further on, another 400 ml of water was added, the organic layer was separated, and the aqueous layer was extracted with 400 ml of ether. The combined organic extract was dried over $Na_2SO_4$, evaporated, and an excess of ethyl acetoacetate was removed by distillation in vacuo (b.p. ≤65° C./6 mm Hg) to give 79.3 g (ca. 100%) of the target product which was further used without an additional purification.

$^1H$ NMR ($CDCl_3$): δ 4.19 (q, J=7.2 Hz, 2H), 4.01 (dd, J=8.3 Hz, J=5.6 Hz, 1H), 3.23 (dd, J=18.5 Hz, J=8.3 Hz, 1H), 3.02 (dd, J=18.5 Hz, J=5.6 Hz, 1H), 2.37 (s, 3H), 1.28 (t, J=7.2 Hz, 3H), 1.17 (s, 9H). $^{13}C\{^1H\}$ NMR ($CDCl_3$): δ 213.36, 202.49, 168.92, 61.57, 53.67, 43.77, 35.70, 30.18, 26.39, 13.95.

3-tert-Butylcyclopent-2-en-1-one

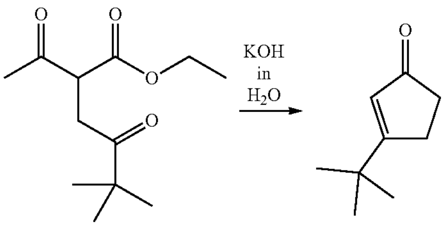

1 L of hot water was added to 37.5 g (164.3 mmol) of ethyl 2-acetyl-5,5-dimethyl-4-oxohexanoate (prepared above). To this mixture a solution of 110 g (1.96 mol) of KOH in 500 ml of water was added dropwise over 1 h at reflux. The reaction mixture was refluxed over 8 h, cooled to room temperature, and then extracted with 3×400 ml of ether. The combined extract was dried over $Na_2SO_4$, filtered through a pad of silica gel 60 (40-63 um), and then evaporated to dryness to give 18.0 g of the crude product contaminated with ca. 15% of 6,6-dimethylheptane-2,5-dione[1]. This crude product originated from four similar syntheses was combined and distilled in vacuum to obtain fractions with different purity of 3-tert-butylcyclopent-2-en-1-one, including the fraction of 3-tert-butylcyclopent-2-en-1-one of ca. 95% purity, which had a higher boiling point than 6,6-dimethylheptane-2,5-dione. Thus, the calculated yield of the target product (given $^1H$ NMR data of pure 3-tert-butylcyclopent-2-en-1-one) was 52.0 g (57%), and 6,6-dimethylheptane-2,5-dione-8.77 g (8.5%). It was shown, that a mixture of 3-tert-butylcyclopent-2-en-1-one with diketone can be used for the subsequent synthesis of the substituted cyclopentadiene.

[1] The increase in reaction time to 11 hours led to a decrease in the 6,6-dimethylheptane-2,5-dione content to 10% without reducing the mass of the resulting mixture $^1H$ NMR ($CDCl_3$): δ 5.95 (t, J=1.7 Hz, 1H), 2.67-2.63 (m, 2H), 2.44-2.40 (m, 2H), 1.2 (s, 9H). $^{13}C\{^1H\}$ NMR ($CDCl_3$): δ 210.54, 191.11, 127.21, 35.41, 35.11, 28.68, 27.58.

1-tert-Butyl-3-[2-(5-trimethylsilyl)furyl]cyclopenta-1,3-diene

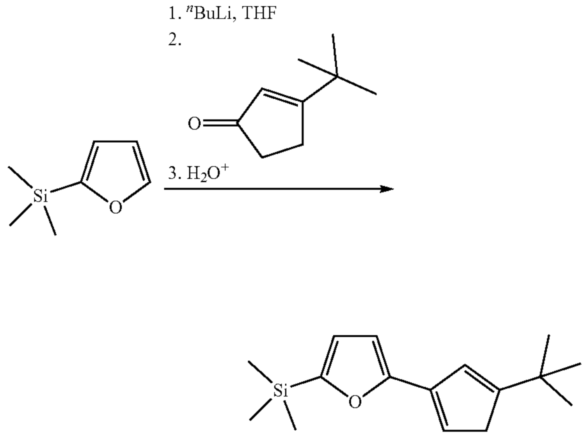

To a cooled to −78° C. solution of 22.2 g (158 mmol) of 2-trimethylsilylfuran in 230 ml of THF 65.2 ml (158 mmol) of 2.43 M $^{n}$BuLi in hexanes was added dropwise. The resulting mixture was stirred for 7.5 h at room temperature, then cooled to −35° C., and 20.0 g of 3-tert-butylcyclopent-2-en-1-one of 89% purity [containing ca. 11% of 6,6-dimethylheptane-2,5-dione, so the added mixture contained 17.55 g (127 mmol) of 3-tert-butylcyclopent-2-en-1-one and 2.45 g (15.68 mmol) of 6,6-dimethylheptane-2,5-dione] was added in one portion. The resulting solution was stirred overnight at room temperature, then cooled in an ice bath, and 200 ml of 4 N HCl was added. This mixture was transferred into a separatory funnel, 500 ml of ether was added, and the obtained mixture was shaken for 1 min. The organic layer was separated, washed with 3×200 ml of water, dried over $Na_2SO_4$, and then evaporated to dryness. The residue was purified by flash column chromatography on silica gel 60 (40-63 um; eluent: hexane) to give 27.5 g (83% based on 3-tert-butylcyclopent-2-en-1-one in a mixture) of the target product (a mixture of two double bond regioisomers in a ca. 88:12 ratio) as an orange oily liquid which spontaneously solidified at room temperature.

$^{1}$H NMR ($CDCl_3$): δ 6.83 (m, 1H), 6.59 (d, J=3.2 Hz, 1H), 6.27 (d, J=3.2 Hz, 1H), 5.89 ("q", J=1.7 Hz, 1H), 3.27 ("t", J=1.4 Hz, 2H), 1.2 (s, 9H), 0.28 (s, 9H). $^{13}C\{^{1}H\}$ NMR ($CDCl_3$): § 158.86, 157.62, 156.36, 137.02, 127.12, 121.29, 121.01, 104.93, 40.01, 32.20, 29.70, −1.48.

Bis[2-(2-(5-trimethylsilyl)furyl)-4-tert-butylcyclopenta-2,4-dien-1-yl]dimethylsilane

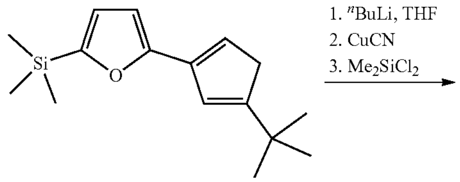

-continued

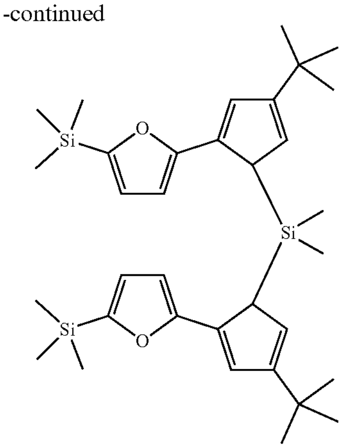

To a cooled to −50° C. solution of 25.5 g (97.9 mmol) of 1-tert-butyl-3-[2-(5-trimethylsilyl)furyl]cyclopenta-1,3-diene in 200 ml of THF 40.3 ml (97.9 mmol) of 2.43 M $^{n}$BuLi in hexanes was added. The resulting dark-red solution was stirred for 3.5 h at room temperature, then cooled to −50° C., and 300 mg of CuCN was added. The obtained mixture was stirred for 15 min at −25° C., then 6.32 g (49.0 mmol) of dichlorodimethylsilane was added in one portion. This mixture was stirred overnight at room temperature. The solvents were removed on rotary evaporator, to the dark-red residue 600 ml of dichloromethane was added, and the resulting mixture was washed with 800 ml of water. The organic layer was separated, dried over $Na_2SO_4$, filtered through a pad of silica gel 60 (40-63 um), which was additionally washed with 2×50 ml of dichloromethane. The combined filtrate was evaporated under reduced pressure. The resulting dark-red oil was dissolved in 500 ml of n-hexane, the obtained suspension was filtered through a pad of silica gel 60 (40-63 um), which was additionally washed with 3×50 ml of n-hexane. The filtrate was evaporated and dried in vacuum to give 25.4 g (90%, purity ca. 90%) of bis[2-(2-(5-trimethylsilyl)furyl)-4-tert-butylcyclopenta-2,4-dien-1-yl]dimethylsilane (a ca. 1:1 mixture of two stereoisomers) as a light-red oil.

$^{1}$H NMR ($CDCl_3$): δ 6.85-6.82 (m, 2H), 6.58 (d, J=3.2 Hz) and 6.57 (d, J=3.2 Hz) {sum 2H}, 6.29 (d, J=3.2 Hz) and 6.27 (d, J=3.2 Hz) {sum 2H}, 6.17 (m) and 6.11 (m) {sum 2H}, 3.87 (d, J=1.2 Hz) and 3.66 (d, J=1.2 Hz) {sum 2H}, 1.24 (s) and 1.19 (s) {sum 18H}, 0.23 (s) and 0.22 (s) {sum 18H}, −0.36 (s), −0.44 (s) and −0.50 (s) {sum 6H}. $^{13}C\{^{1}H\}$ NMR ($CDCl_3$): δ 158.41, 158.40, 156.50, 156.43, 156.09, 155.78, 138.14, 138.03, 126.69, 126.59, 124.53, 123.75, 121.37 (two resonances), 104.90, 104.82, 48.75, 47.78, 32.30, 32.24, 30.41, 30.38, −1.43, −1.46, −4.29, −6.52, −6.76.

Rac- and meso-dimethylsilanediyl-bis[$\eta^5$-2-(2-(5-trimethylsilyl)furyl)-4-tert-butylcyclopentadienyl] zirconium dichloride

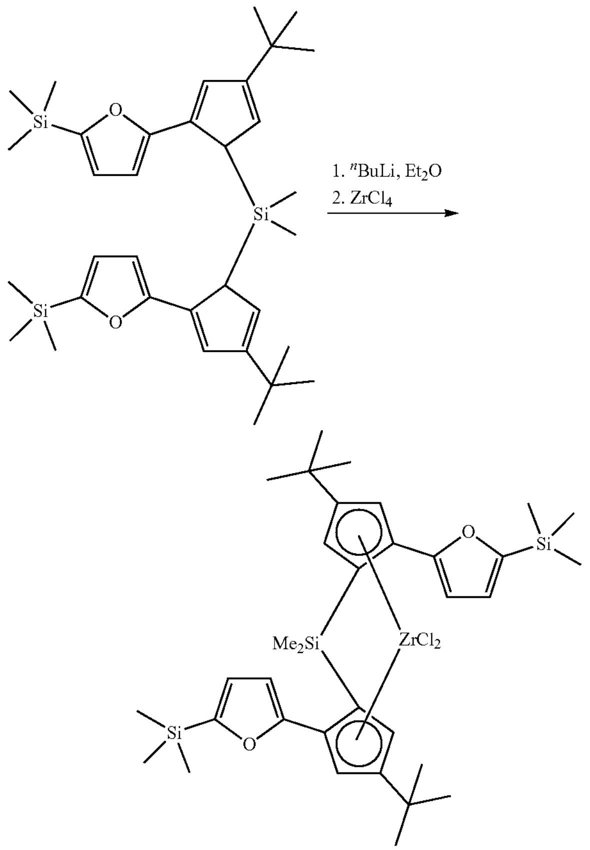

To a cooled to −78° C. solution of 25.4 g (44.0 mmol) of bis[2-(2-(5-trimethylsilyl)furyl)-4-tert-butylcyclopenta-2,4-dien-1-yl]dimethylsilane in 350 ml of ether 36.2 ml (88.0 mmol) of 2.43 M $^n$BuLi in hexanes was added. This mixture was stirred overnight at room temperature, then the resulting red solution was cooled to −78° C., and 10.3 g (44.2 mmol) of $ZrCl_4$ was added. The reaction mixture was stirred for 24 h at room temperature to give dark-red solution with yellow precipitate. This mixture was evaporated to dryness. The residue was stirred with 200 ml of hot toluene, and the formed suspension was filtered through a glass frit (G4). This filtrate was evaporated to ca. 100 ml. Light-orange precipitate fallen from this solution for 3 h at room temperature was washed with 10 ml of toluene and then dried in vacuum. This procedure gave 9.70 g (30%) of pure rac-complex. The mother liquor was evaporated to ca. 10 ml, the formed solution was heated to ca. 60° C., and then 30 ml of n-hexane was added. Yellow powder (meso-complex contaminated with 5% of rac-isomer) and red crystals (a ca. 4:1 mixture of rac- and meso-comp) precipitated from this solution overnight at room temperature were filtered off (G4) to give 9.30 g of meso-zirconocene contaminated with ca. 15% of rac-complex. The mother liquor was evaporated almost to dryness, and the residue was dissolved in 40 ml of n-hexane. Yellow solid precipitated from the resulting mixture overnight at room temperature was filtered off (G4) and dried in vacuum. This procedure gave 3.50 g of a mixture of meso-/rac-complexes in a 67:43 ratio. Thus, the total yield of rac- and meso-zirconocene dichloride was 22.5 g (69%). To the yellow powder from the second fraction (9.30 g, yellow powder with red crystals) 120 ml of n-hexane was added, the yellow powder was shortly dissolved, and the red crystals were immediately filtered off (G3). The filtrate was evaporated to dryness, and the residue was recrystallized from a mixture of 7 ml of toluene and 15 ml of n-hexane to give 4.50 g (14%) of pure meso-dimethylsilanediyl-bis[$\eta^5$-2-(2-(5-trimethylsilyl)furyl)-4-tert-butylcyclopentadienyl] zirconium dichloride.

Rac-dimethylsilanediyl-bis[$\eta^5$-2-(2-(5-trimethylsilyl)furyl)-4-tert-butylcyclopentadienyl]-zirconium dichloride.

Anal. calc. for $C_{34}H_{50}C_{12}O_2Si_3Zr$: C, 55.40; H, 6.84. Found: C, 55.64; H, 7.02.

$^1$H NMR ($CDCl_3$): δ 6.75 (d, J=2.5 Hz, 2H), 6.67 (d, J=3.3 Hz, 2H), 6.54 (d, J=3.3 Hz, 2H), 5.54 (d, J=2.5 Hz, 2H), 1.26 (s, 18H), 0.84 (s, 6H), 0.33 (s, 18H). $^{13}C\{^1H\}$ NMR ($CDCl_3$): δ 159.89, 153.94, 153.36, 124.98, 123.70, 122.07, 111.58, 109.47, 103.22, 33.89, 30.16, −0.09, −1.31.

Meso-dimethylsilanediyl-bis[$\eta^5$-2-(2-(5-trimethylsilyl)furyl)-4-tert-butylcyclopentadienyl]-zirconium dichloride (this stereoisomer was not used in catalyst preparation and polymerisation examples).

Anal. calc. for $C_{34}H_{50}C_{12}O_2Si_3Zr$: C, 55.40; H, 6.84. Found: C, 55.77; H, 7.09.

$^1$H NMR ($CDCl_3$): δ 6.82 (d, J=2.5 Hz, 2H), 6.25 (d, J=3.3 Hz, 2H), 6.07 (d, J=3.3 Hz, 2H), 5.69 (d, J=2.5 Hz, 2H), 1.35 (s, 18H), 1.04 (s, 3H), 0.74 (s, 3H), 0.28 (s, 18H). $^{13}C\{^1H\}$ NMR ($CDCl_3$): δ 158.44, 152.94, 152.89, 127.08, 124.46, 122.28, 111.97, 108.47, 101.59, 34.10, 30.35, 1.77, −1.36, −2.89.

Inventive Complexes MC1 to MC2 are:

(MC1)

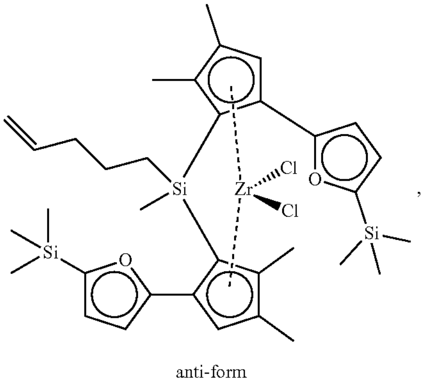

anti-form (MC2)

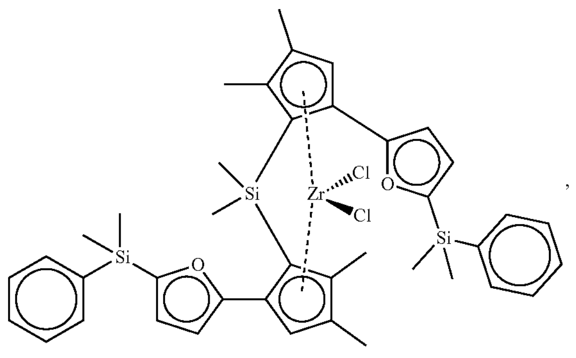

rac-form

Comparative Metallocenes are:

(MC3)

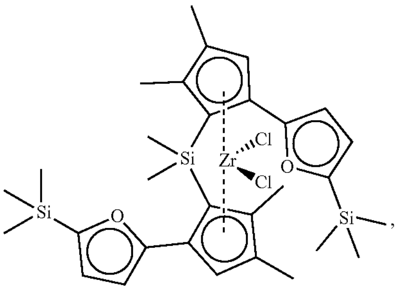

rac-form (MC4)

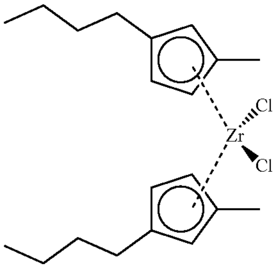

(MC5)

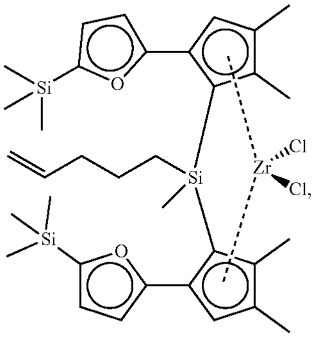

meso-form

-continued (MC6)

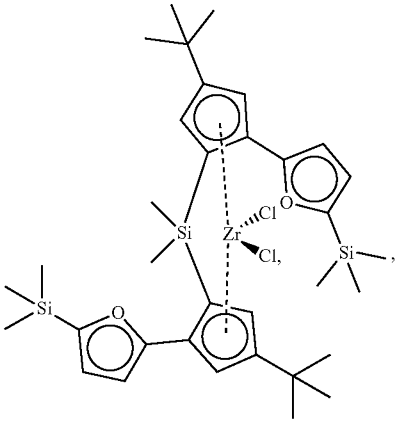

rac-form

Catalyst Preparation

All catalyst examples were prepared using the below “General one-step catalyst preparation method” and are summarised in Table 1.

TABLE 1

Catalyst inventive and comparative examples

| | Catalyst | | | | | |
|---|---|---|---|---|---|---|
| | IC1 | IC2 | CC1 | CC2 | CC3 | CC4 |
| | Metallocene in catalyst | | | | | |
| | MC1 | MC2 | MC3 | MC4 | MC5 | MC6 |
| Al/Zr loading ratio, mol/mol | 100 | 100 | 100 | 100 | 100 | 100 |
| Zr content, wt % | 0.307 | 0.317 | 0.309 | 0.279 | 0.326 | 0.277 |
| Al content, wt % | 12.4 | 12.2 | 12.2 | 11.7 | 12.4 | 11.0 |
| Volatiles, wt % | 0.5 | <0.2 | <0.2 | 1.3 | <0.2 | 2.6 |

General One-Step Catalyst Preparation Method

A pre-contact mixture, obtainable by dissolution of 140 μmol of metallocene in Methylaluminoxane solution (14 mmol Al as 30 wt % MAO solution in Toluene) and 1.6 mL of additional Toluene, is stirred for 2 hours in a glass vial at room temperature in Nitrogen atmosphere. The obtained solution is then added drop-wise within 5 minutes to 2 g of pre-treated silica carrier in a glass reactor under gentle mechanical stirring at 10-30° C. The crude catalyst is then gently mixed for 1 hour further and left to stand for further 17 hours. The catalyst is then dried in vacuo for 60 minutes at 60° C.

Polymerisation Experiment 1: Unimodal Ethylene/1-Hexene Copolymerisation

All catalyst examples were tested in Ethylene copolymerisation in slurry phase using the below "General bench-scale Ethylene slurry phase copolymerisation method" and the corresponding example are summarised in Table 2.

General Bench-Scale Ethylene Slurry Phase Copolymerisation Method

Scavenger feed vessel is filled with 1.5 mL of Triisobutylaluminium (TiBA; 10% solution in Heptane), and attached to the polymerisation reactor. The TiBA solution is added using $N_2$ pressure (5.0 bar) to an empty reactor. The reactor pressure is reduced to 0.2 bar of $N_2$ after the TiBA feed.

Reactor is filled with 1250 mL of liquid Propane at 20° C., reactor pressure is 8.92 bar. Rector is heated to the desired prepolymerization temperature of 60° C. with stirring rate of 350 rpm. The pressure in the reactor is 21.95 bar.

0.2 bar of $H_2$ from a 500 mL vessel is filled into the line. Ethylene (32.6 g) and 1-Hexene (5.0 mL/3.4 g) corresponding to a pressure difference of 3.70 bar were added to the reactor through the line containing $H_2$. The pressure in the reactor increases to 25.65 bar.

The desired amount of catalyst (typically 25-35 mg) is weighed into catalyst feeder inside a glovebox. The catalyst feeder is attached to the polymerisation reactor and air in the line is removed by 3 repeated cycles of vacuum and $N_2$ filling. After inertization of the line, the catalyst is flushed into the reactor with 100 mL of Propane, and stirring speed is increased to 550 rpm. The pressure in the reactor is about 25.61 bar.

The prepolymerization step is continued until 2-5% of the prepoly material (roughly, it corresponds to 2-5 g of $C_2$ consumption) is formed at 60° C. by keeping the pressure constant by feeding Ethylene with a flow meter. Typically, it takes about 40 minutes to achieve the desired degree of prepolymerization.

The temperature of the polymerisation reactor is raised to 85° C. resulting in the reactor pressure of 40.4 bar.

0.2 bar of $H_2$ from a 500 mL vessel is filled into the line. Ethylene (62.5 g) and 1-Hexene (10.0 mL/6.7 g) corresponding to a pressure difference of 6.70 bar are added into the reactor through the line containing $H_2$.

For slurry polymerisation step, the reactor is stirred at 85° C. for 60 min. The pressure is kept constant by feeding Ethylene through flow meter. After 60 min of polymerisation, the reaction is stopped by reducing the stirring to 150 rpm, venting the reactor and reducing the temperature to 60° C. For removing hydrocarbon residues (before opening)—reactor is flushed 10 times by pressurising/releasing 1 bar of Nitrogen pressure. Reactor is cooled down to 20° C. before opening it.

TABLE 2

Ethylene/1-Hexene copolymerisation of inventive and comparative examples.

| Polymerisation Example | IE1-1 | IE2-1 | CE1-1 | CE2-1 | CE3-1 | CE4-1 |
|---|---|---|---|---|---|---|
| Catalyst used | IC1 | IC2 | CC1 | CC2 | CC3 | CC4 |
| Metallocene in catalyst | MC1 | MC2 | MC3 | MC4 | MC5 | MC6 |
| Activity, $kg_{PE}/(g_{cat}*h)$ | 6.3 | 3.8 | 2.8 | 1.6 | 2.7 | 0.5 |
| 1-Hexene incorporation, wt % | 4.2 | 4.2 | 3.9 | 1.0 | 2.0 | 1.3 |
| $MFR_{21}$, g/10 min | 59.7 | 41.8 | 59.2 | 113.5 | 85 | — |
| $MFR_2$, g/10 min | 2.2 | 1.8 | 2.7 | 5.5 | 1.6 | 47 |
| $FRR_{21:2}$ | 27.1 | 23.2 | 21.9 | 20.6 | 53.1 | — |
| Bulk Density, $g/cm^3$ | 0.36 | 0.38 | 0.37 | 0.38 | 0.37 | 0.38 |

The inventors surprisingly found when the inventive metallocene complexes are heterogenised in the described manner to give inventive IC1 and IC2, superior catalyst activity (FIG. 1), comonomer sensitivity (FIG. 2), $M_w$ capability (FIG. 3) and kinetics (FIG. 6) compared to CC1-CC4 are observed.

Crucially, IC1 and IC2 show a combination of high $M_w$ capability, high comonomer sensitivity, high activity (FIG. 4 and FIG. 5) and stable kinetics (FIG. 6).

As can be seen from FIG. 1, catalyst activity of IC1 and IC2 in polymerisation examples IE1-1 and IE2-1 was improved by 126% and 35% compared to those of CC1 (example CE1-1). The increase in activity of IC1 in slurry conditions is especially prominent (IE1-1). This increase in activity is attributed to the presence of the long alkenyl chain in the metallocene structure (compare MC1 with MC3 from CC1). The use of an alkenyl chain has never before been adopted in furyl-substituted bridged bis-Cp's.

The inventors also found that such an effect becomes irrelevant for more open meso-forms, as demonstrated by CC3 (complex MC5 which has otherwise the same structure as MC1 from IC1) that performs differently (inferior). The similar performance-diminishing effect of a meso-form is not general but was experienced also at least for the meso-isomers of MC3 and MC6. Comparison of examples IE1-1 to CE3-1 demonstrates the importance of selective utilisation of pure stereoisomeric forms for best performance. The halved comonomer sensitivity of CC3 compared to IC1 indicates the superiority of more sterically shielded structures over more open meso-forms.

Comparison of IE1-1 and IE2-1 to CE4-1 demonstrates the importance of careful selection of the metallocene structure, e.g. the substitution pattern within the same metallocene type, when high performance is concerned. Performance of CC4 is low even though the furyl moiety of the metallocene is exactly the same as in IC1. It reveals that introducing one bulky substituent in the Cp-ring in position 4 instead of two small substituents in positions 4 and 5 sterically hinders the approach to the metal centre, rendering the complex useless in Ethylene polymerisation.

Poor performance of CC2 (unbridged bis-Cp complex MC4) demonstrates the overall strong advantage of furyl-substituted bridged bis-Cp complexes per se, compared to the unbridged bis-Cp complexes when heterogenised and activated in the same way. In this respect, especially with regards to copolymer molecular weights and comonomer incorporation, the potential of the bridged furyl-based bis-Cp examples is immense compared to common commercial bis-Cp's.

FIG. 2 shows a 7% increase in comonomer sensitivity of IC1 and IC2 compared to CC1. Such an increase is usually strongly linked to a metallocene structure. Hence, a 7% increase is a satisfactory achievement that could benefit the economics of the polymerisation process.

FIG. 3 shows increased $M_w$ capability under employed copolymerisation conditions of MC1 and MC2 (catalyst examples IC1 and IC2) over MC3 (CC1) $M_w$ capability, while also greatly improving over MC4 (catalyst CC2), up to 68% lower MFR2 values. This provides a potential use of the novel catalysts for production of certain copolymer grades which are otherwise inaccessible with common unbridged Zr-based bis-Cp's.

It is the combination of the above effects and improved performances (FIG. 4 and FIG. 5) that is particularly valuable. Higher activity and improved comonomer sensitivity combined with higher $M_w$ capability are crucial for the economically viable performance of the catalyst.

FIG. 6 demonstrates not only the superior catalyst performance in IE1-1 and IE2-1 but also the desired stable polymerisation kinetic profiles. The higher profile for IE1-1 during the first 40 minutes of experiment reflects the higher activity of IC1 in the prepolymerization step.

General Propylene Bulk Phase Homopolymerization Method

Propylene homopolymerizations are carried out in bulk phase in a 0.48 L autoclave. The reactor is inertized and purged with Propylene before the start of the experiment. 25 mL (1.1 mmol) of Hydrogen is fed batch-wise into the empty reactor. The reactor is filled with 280 mL of liquid Propylene at 20° C., pressure at 10.5 bar. 100 μL of Triethylaluminum (TEA; 0.25 mol/L solution in Heptane) is added as a scavenger using Nitrogen (0.7 bar). Contact time between propylene and TEA is 20 min. Stirring speed is 350 rpm and kept constant during the entire experiment.

Dry catalyst (40-50 mg) is weighed into a catalyst vial and suspended in Heptane (solid content=6.7-8.3 mg/mL). An aliquot of the catalyst/Heptane slurry is injected into the prepared reactor thus having a total amount of 16-20 mg of catalyst in the reactor, using Nitrogen (0.7 bar). The prepolymerization step is carried out at 20° C., at total pressure of 11.6 bar for 20 min. The reactor is then heated up to main bulk polymerisation temperature of 80° C. within 7-10 min. Bulk polymerisation is carried out at 80° C., at a total pressure of 36.5 bar for 60 min. In case of low catalyst activity, polymerisation time is extended to 120 min.

The polymerisation is stopped by cooling down the reactor to ambient temperature, reducing the stirrer speed to 20 ppm, flushing off the reactor and adding $O_2/N_2$ (1% $O_2$) gas mixture up to 76 bar. The reactor is vented and a flushing procedure (vacuum, $N_2$>7 bar-vacuum, repeated several times) is applied in order to remove the remaining Propylene. The removed polymer powder is stabilised using 2500 ppm of Irganox B225 (dissolved in Acetone) and dried on the air in a fume hood.

Polymerisation experiments with each catalyst are carried out in duplicates. The mean polymerisation results, as well as polymer characterisation data (including MFR, GPC, DSC, solution state NMR, XCS and Crystex) are summarised in Table 3.

TABLE 3

| Propylene homopolymerisation results | | | | | |
|---|---|---|---|---|---|
| Polymerisation Example | IE1-2 | IE2-2 | CE1-2 | CE3-2 | CE4-2 |
| Catalyst used | IC1 | IC2 | CC1 | CC3 | CC4 |
| Metallocene in catalyst | MC1 | MC2 | MC3 | MC5 | MC6 |
| Activity (mean), $kg_{PP}/(g_{cat} \cdot h)$ | 1.56 | 1.5 | 1.08 | 0.45 | 0.14 |
| Bulk Density (mean), g/cm$^3$ | 0.402 | 0.447 | 0.431 | n.a. | n.a. |
| MFR$_2$ (mean), g/10 min | 571 | 222 | 336 | n.a. | n.a. |
| $M_w$, g/mol | 65500 | 92600 | 80700 | 38300 | 7270 |
| $T_m$ (mean), ° C. | 142.7 | 139.65 | 141 | 141.9 | 140 |
| XCS (gravimetric), wt % | 1.87 | 1.38 | 1.68 | n.a. | 63.44 |
| Soluble Factions (Crystex), wt % | 2.1 | 1.49 | 1.86 | 91.36 | 66.12 |
| Pentad-isotacticity, % | 87.06 | 86.41 | 86.66 | 12.03 | 78.13 |
| Morphology | Powder, spherical particles | Powder, spherical particles | Powder, spherical particles | Viscous oil | Irregular polymer flakes, partly molten |

Polymerisation Experiment 2: Unimodal Propylene Homopolymerization

All catalyst examples (excluding CC2) were tested in propylene homopolymerization in bulk propylene using the below "General Propylene bulk phase homopolymerization method" and the corresponding example are summarised in Table 3.

Surprisingly, it was found that MC1 and MC2 (inventive examples) can also polymerise under propylene polymerisation conditions. The inventors surprisingly found when the inventive metallocene complexes are heterogenised in the described manner to give inventive IC1 and IC2, as demonstrated in FIG. 7, IE1-2 and IE2-2 exhibit improved catalyst activity by 45% and 36% respectively, compared to CE1-2. Good powder morphology with largely spherical polypropylene particles and higher bulk density of >0.4 $g/cm^3$ is achieved. Compared to CE1-2, the examples CE3-2 and CE4-2 reveal significantly lower activity and poor morphology. Outcome of CE3-2 (produced by comparative catalyst example CC3 that is based on meso complex MC5) is a completely amorphous, oily polymer material, whereas CE4-2 represents irregular polymer flakes with partially molten agglomerates.

IE2-2 demonstrates higher activity, according to FIG. 8, as well as higher weight average molecular weight ($M_w$) compared to CE1-2, whereas IE1-2 reveals higher activity but lower $M_w$ compared to CE1-2. CC3 and CC4 comparative catalyst examples possess the lowest polypropylene $M_w$ capability in comparison to IC1, IC2 and CC1.

As per FIG. 9 and FIG. 10, IE1-2 and IE2-2 experiments result in comparable PP isotacticity as well as soluble fraction. CE3-2 provides significantly low isotacticity and very high soluble fraction, which is reflected in the mentioned highly amorphous, oily nature of the polymer. CE4-2 also reveals lower isotacticity and significantly higher soluble fraction compared to CE1-2.

MC1 and MC2 are therefore capable of producing homo-PP with similar properties as literature-known MC3 at significantly higher catalyst activity. This is achieved at low xylene solubles.

Similar to the findings in ethylene polymerisation, in propylene bulk polymerisation, IC1 and IC2 demonstrate a higher catalyst activity than the comparative CC1, while the $M_w$ capability is on a similar level. Good powder morphology with spherical polymer particles is obtained. The derived polymer properties for MC1 and MC2, e.g. isotacticity, soluble fraction and melting temperature, are on comparable levels. MC5 and MC6 (comparative examples) show in general poor performance under propylene polymerisation conditions. For these comparative examples, low catalyst activity with poor polymer morphology and low molecular weight, as well as low isotacticity are derived.

The invention claimed is:

1. A racemic metallocene complex of formula (I')

(I')

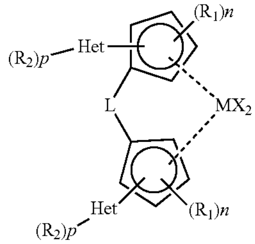

wherein each X is a sigma donor ligand;

L is a carbon, silicon or germanium based divalent bridge in which one or two backbone atoms link the ligands;

M is Ti, Zr or Hf;

each Het is independently a monocyclic or multicyclic heteroaromatic or heterocyclic group containing at least one heteroatom selected from O, N or S;

each $R_1$ is the same or different and is a linear $C_{1-10}$ alkyl group, or linear $C_{1-10}$ alkoxy, each n is 0 to 3;

each $R_2$ is the same or different and is a —Si(RaRbRc) group;

Ra is $C_{1-10}$ alkyl or phenyl group optionally substituted by 1 to 3 $C_{1-6}$ alkyl groups;

Rb is $C_{1-10}$ alkyl or phenyl group optionally substituted by 1 to 3 $C_{1-6}$ alkyl groups;

Rc is a phenyl group optionally substituted by 1 to 3 $C_{1-6}$ alkyl groups; and each p is 1 to 3.

2. A racemic metallocene complex of formula (Ia)

(Ia)

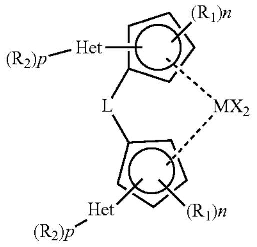

wherein each X is a sigma donor ligand;

each Het is independently a monocyclic or multicyclic heteroaromatic or heterocyclic group containing at least one heteroatom selected from O, N or S;

L is a (RdRe)Si group, a (RdRe)Ge group or a $(RdRe)CH_2$ group;

Rd is a $C_{1-10}$ alkyl group, a $C_{5-10}$-cycloalkyl group, benzyl or phenyl;

Re is a $C_{2-10}$ alkenyl group;

M is Ti, Zr or Hf;

each $R_1$ is the same or different and is a linear $C_{1-10}$ alkyl group or a linear $C_{1-10}$ alkoxy group;

each n is 0 to 3;

each $R_2$ is the same or different and is a $C_{1-10}$ alkyl group, $C_{1-10}$ alkoxy group or $—Si(R)_3$ group;

each R is the same or different and is a $C_{1-10}$ alkyl or phenyl group optionally substituted by 1 to 3 $C_{1-6}$ alkyl groups; and each p is 0 to 3.

3. The racemic metallocene complex as claimed in claim 2, wherein:

L is a (RdRe)Si group;

Rd is a $C_{1-10}$ alkyl group; and

Re is a $C_{2-10}$ alkenyl group.

4. The racemic metallocene complex as claimed in claim 1, wherein L is $—R'_2C—$, $—R'_2C—CR'_2—$, $—R'_2Si—$, $—R'_2Si—SiR'_2—$, $—R'_2Ge—$, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring.

5. The racemic metallocene complex as claimed in claim 1, wherein L is a (ReRd)Si group, where Rd is a $C_{1-10}$ alkyl group and Re is a $C_{2-10}$ alkenyl group or a $—Si(Me)_2$.

6. The racemic metallocene complex as claimed in claim 1, wherein each Het is independently a monocyclic heteroaromatic or heterocyclic group containing at least one heteroatom selected from O or S.

7. The racemic metallocene complex as claimed in claim 1, wherein each $R_1$ is the same or different and is a linear $C_{1-6}$ alkyl group.

8. The racemic metallocene complex as claimed in claim 1, wherein each X is independently chlorine, benzyl, cyclohexyl, or a methyl group.

9. The racemic metallocene complex as claimed in claim 1, wherein M is Zr.

10. The racemic metallocene complex as claimed in claim 1, wherein the complex is C2 symmetric.

11. The racemic metallocene complex as claimed in claim 1, wherein n is 1 or 2.

12. The racemic metallocene complex as claimed in claim 1, wherein p is 1.

13. The racemic metallocene complex as claimed in claim 3, wherein:

each $R_1$ is the same or different and is a linear $C_{1-10}$ alkyl group;

each n is 1 to 3;

each $R_2$ is the same or different and is a —$Si(R)_3$ group; and each R is the same or different and is $C_{1-10}$ alkyl or phenyl group optionally substituted by 1 to 3 $C_{1-6}$ alkyl groups.

14. The racemic metallocene complex as claimed in claim 2, wherein the complex is of formula (XII')

(XII')

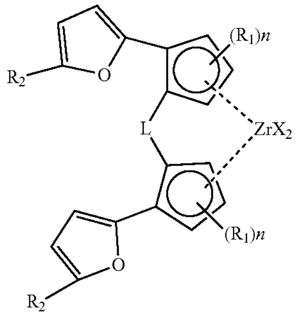

wherein each X is a sigma donor ligand;

L is a (RdRe)Si group;

Rd is a $C_{1-10}$ alkyl group;

Re is a $C_{2-10}$ alkenyl group;

each $R_1$ is the same or different and is a linear $C_{1-10}$ alkyl group, such as methyl;

each n is 1 to 3;

each $R_2$ is the same or different and is a —$Si(R)_3$ group; and each R is the same or different and is $C_{1-10}$ alkyl or phenyl group optionally substituted by 1 to 3 $C_{1-6}$ alkyl groups.

15. The racemic metallocene complex as claimed in claim 1, wherein said complex is:

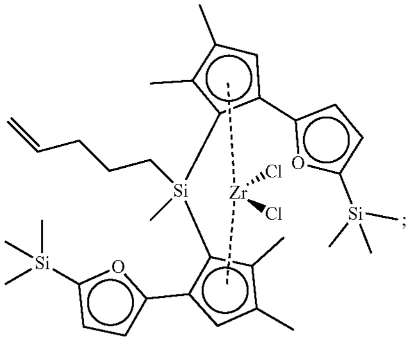

; or (MC1), anti-form

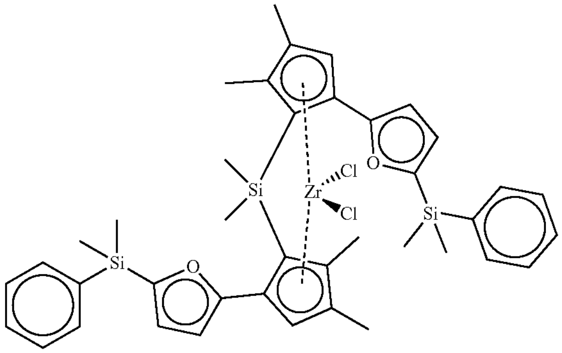

.

(MC2), rac-form

16. A metallocene catalyst comprising:

(i) the racemic metallocene complex as defined in claim 1;

(ii) a cocatalyst which comprises a compound of a group 13 element; and optionally (iii) a support.

17. The metallocene catalyst as claimed in claim 16, wherein the cocatalyst is an aluminoxane.

18. The metallocene catalyst as claimed in claim 16, wherein the support is present and is a porous inorganic support.

19. A process for the preparation of a metallocene catalyst, the process comprising:

contacting a solid support with a solution of a cocatalyst comprising a compound of a group 13 element and the racemic metallocene complex as defined in claim 1 so as to form a supported catalyst; or (I) contacting a solid support with a solution of a cocatalyst comprising a compound of a group 13 element, so as to form a cocatalyst impregnated support; and (II) contacting said cocatalyst impregnated support with the racemic metallocene complex as claimed in claim 1;

so as to form a supported catalyst.

* * * * *